(12) United States Patent
Schlanger

(10) Patent No.: US 10,814,671 B2
(45) Date of Patent: Oct. 27, 2020

(54) FIBER REINFORCED TENSILE ELEMENT

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 632 days.

(21) Appl. No.: 15/412,151

(22) Filed: Jan. 23, 2017

(65) Prior Publication Data

US 2017/0129278 A1    May 11, 2017

Related U.S. Application Data

(63) Continuation-in-part of application No. 14/641,615, filed on Mar. 9, 2015, now Pat. No. 9,815,321, which is a continuation-in-part of application No. 12/930,643, filed on Jan. 13, 2011, now Pat. No. 8,985,709, which is a continuation-in-part of application No. 12/806,064, filed on Aug. 5, 2010, (Continued)

(51) Int. Cl.
| | |
|---|---|
| *B60B 1/02* | (2006.01) |
| *B60B 1/04* | (2006.01) |
| *B60B 1/00* | (2006.01) |
| *B60B 21/06* | (2006.01) |
| *B60B 5/02* | (2006.01) |
| *B60B 21/02* | (2006.01) |

(52) U.S. Cl.
CPC .......... *B60B 1/0261* (2013.01); *B60B 1/003* (2013.01); *B60B 1/0246* (2013.01); *B60B 1/041* (2013.01); *B60B 1/042* (2013.01); *B60B 1/043* (2013.01); *B60B 5/02* (2013.01); *B60B 21/062* (2013.01); *B60B 21/064* (2013.01); *B60B 1/006* (2013.01); *B60B 1/0284* (2013.01); *B60B 1/044* (2013.01); *B60B 21/025* (2013.01); *B60B 2360/3416* (2013.01); *B60B 2900/111* (2013.01); *B60B 2900/131* (2013.01); *B60B 2900/212* (2013.01); *B60B 2900/311* (2013.01); *B60B 2900/325* (2013.01)

(58) Field of Classification Search
CPC ......... B60B 1/003; B60B 1/02; B60B 1/0246; B60B 1/0261; B60B 1/04; B60B 1/041; B60B 1/042; B60B 1/043
See application file for complete search history.

(56) References Cited

U.S. PATENT DOCUMENTS

| | | | |
|---|---|---|---|
| 4,729,605 A | * | 3/1988 | Imao .................. B60B 5/02 301/104 |
| 5,110,190 A | | 5/1992 | Johnson |

(Continued)

*Primary Examiner* — Jason R Bellinger

(57) ABSTRACT

A tensile element connection, comprising first and second bracing elements and a tensile element having a first portion connected to the first bracing element and a second portion opposed to the first portion and connected to the second bracing element, and an applied tensile load along the tensile element. The tensile element includes a preformed rod that is comprised of reinforcement fibers in a matrix. At a temporarily elevated temperature greater than the service temperature, a localized region of the matrix is in a softened state of increased deformability such that a localized region of the rod is deformed under pressure to include a laterally outwardly projecting engagement surface. The tensile element is comprised of said rod with the engagement surface formed therein and is connected to one of the first and second bracing elements by means of an overlie engagement at the engagement surface to restrain the tension load.

33 Claims, 18 Drawing Sheets

Related U.S. Application Data now Pat. No. 8,657,387, which is a continuation-in-part of application No. 11/879,333, filed on Jul. 17, 2007, now Pat. No. 7,784,878, which is a continuation-in-part of application No. 10/755,653, filed on Jan. 12, 2004, now Pat. No. 7,357,460.

(60) Provisional application No. 62/289,389, filed on Feb. 1, 2016, provisional application No. 60/439,819, filed on Jan. 13, 2003.

(56) References Cited

U.S. PATENT DOCUMENTS

| | | | | |
|---|---|---|---|---|
| 5,350,221 | A * | 9/1994 | Pearce | B60B 1/003 |
| | | | | 301/104 |
| 5,779,323 | A | 7/1998 | Burrows | |
| 6,036,281 | A | 3/2000 | Campbell | |
| 6,520,595 | B1 * | 2/2003 | Schlanger | B60B 1/003 |
| | | | | 301/59 |
| 7,357,459 | B2 * | 4/2008 | Schlanger | B60B 1/003 |
| | | | | 301/59 |
| 7,357,460 | B2 * | 4/2008 | Schlanger | B60B 1/0261 |
| | | | | 301/104 |
| 7,784,878 | B2 * | 8/2010 | Schlanger | B60B 1/003 |
| | | | | 301/104 |
| 7,862,128 | B2 | 1/2011 | Schlanger | |
| 8,657,387 | B2 * | 2/2014 | Schlanger | B60B 1/003 |
| | | | | 301/104 |
| 8,985,709 | B2 * | 3/2015 | Schlanger | B60B 1/003 |
| | | | | 301/104 |
| 9,815,321 | B2 * | 11/2017 | Schlanger | B60B 1/003 |

* cited by examiner

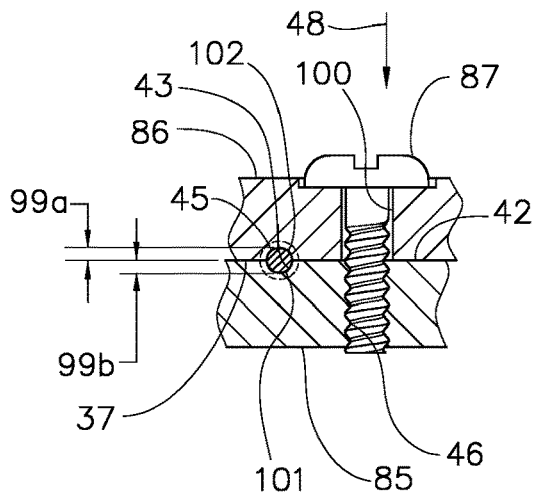
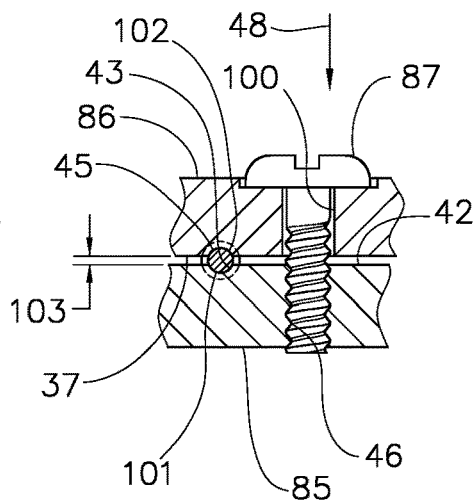
FIG. 11d
FIG. 11e
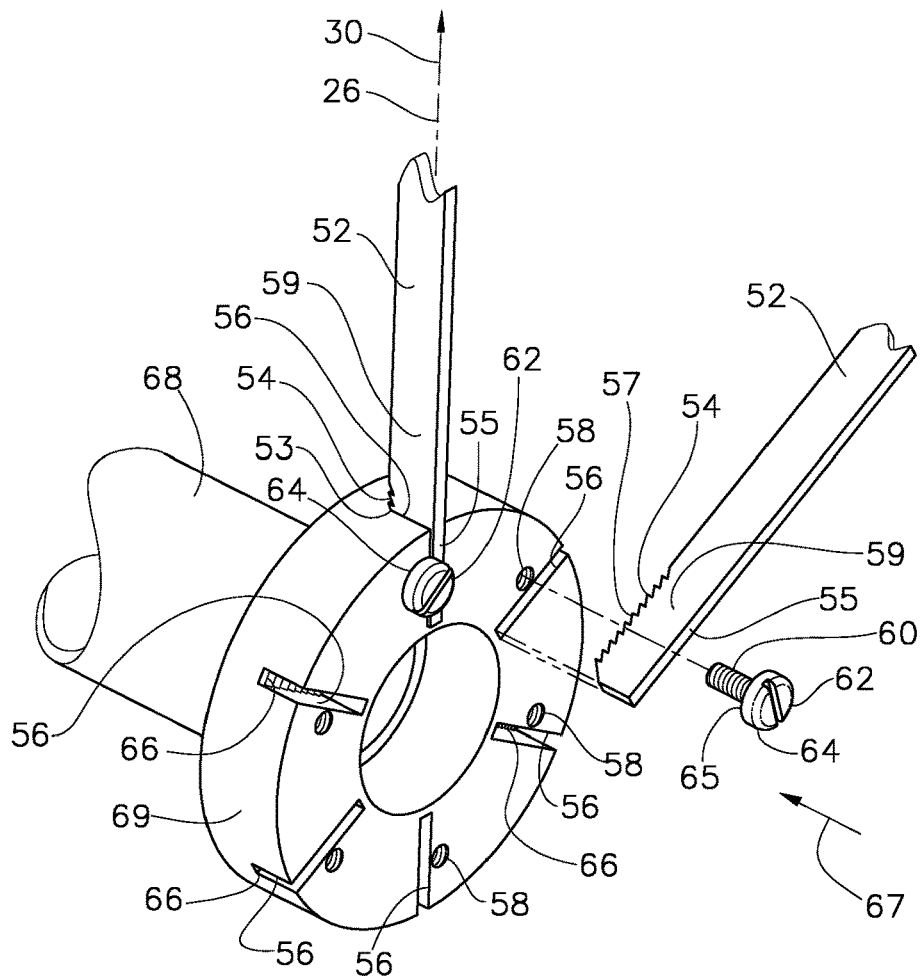
FIG. 12

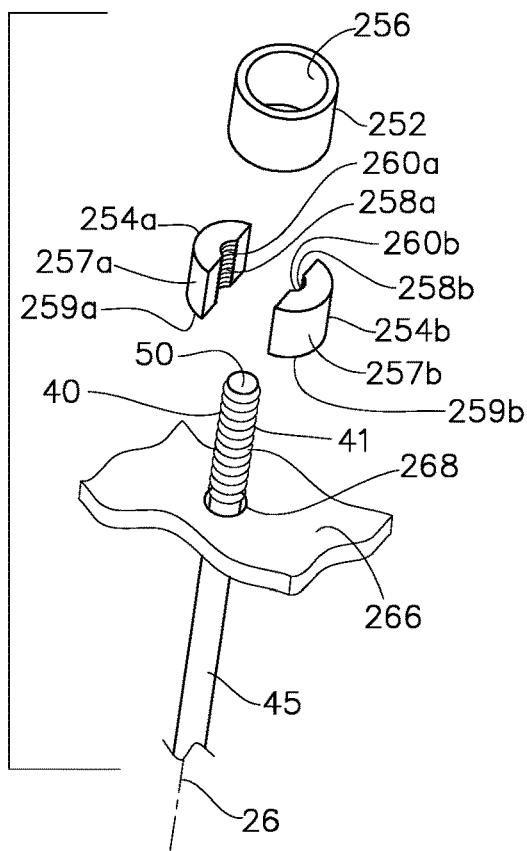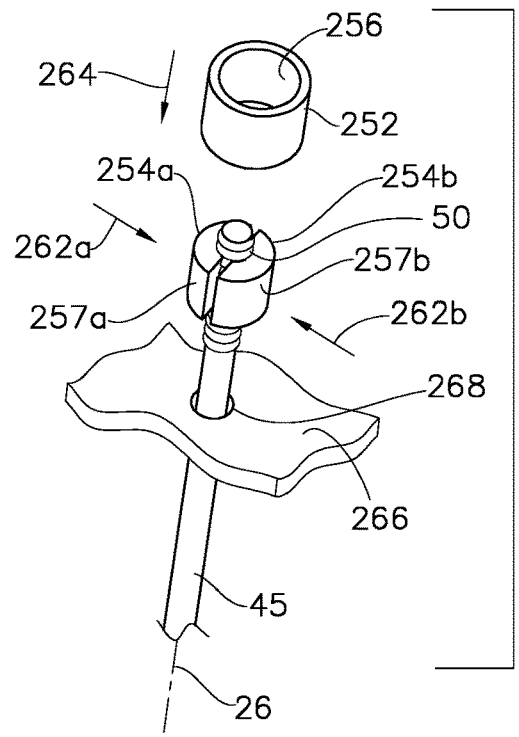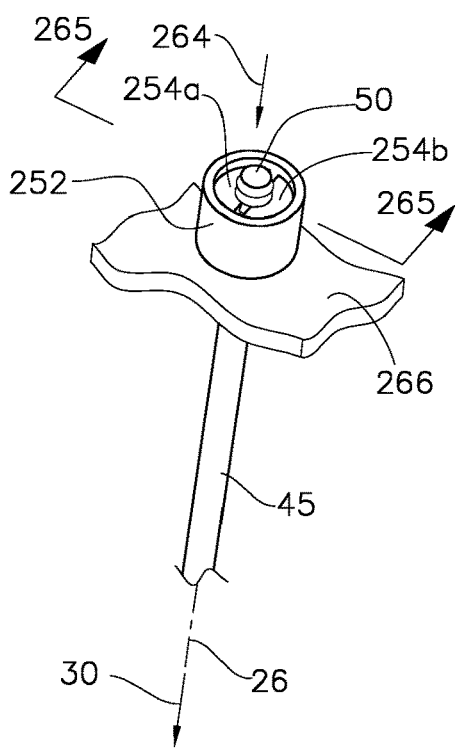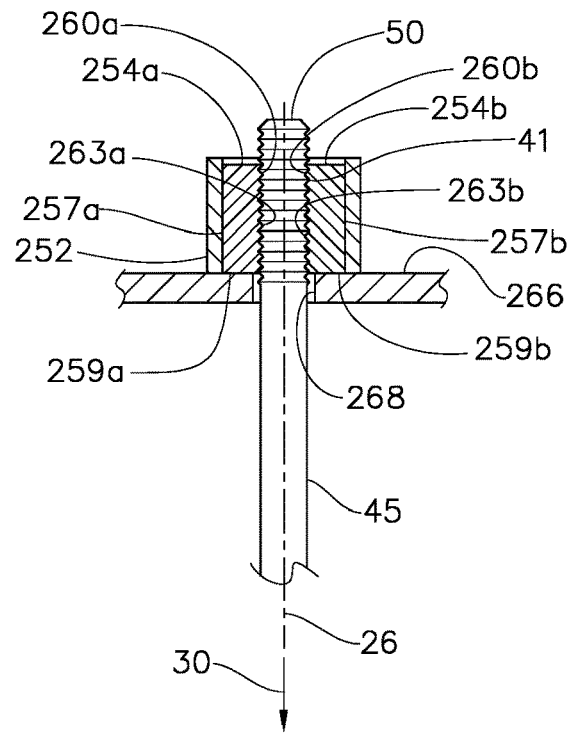
FIG. 13a
FIG. 13b
FIG. 13c
FIG. 13d

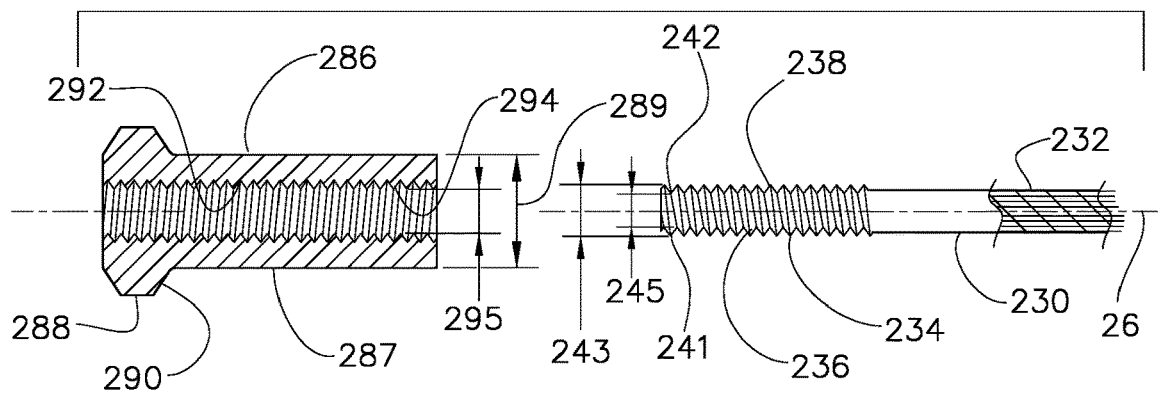
FIG. 15a
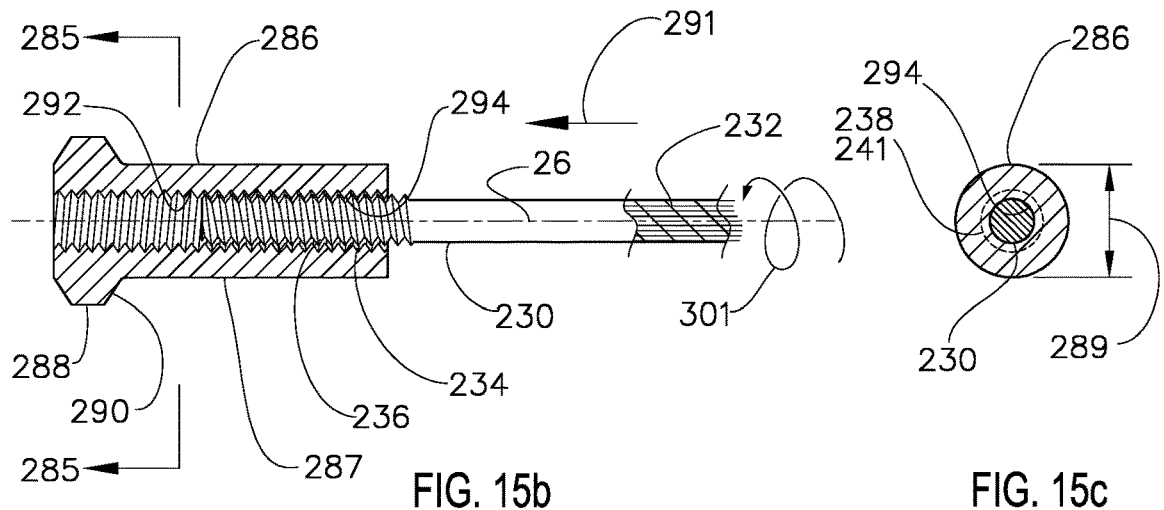
FIG. 15b                    FIG. 15c
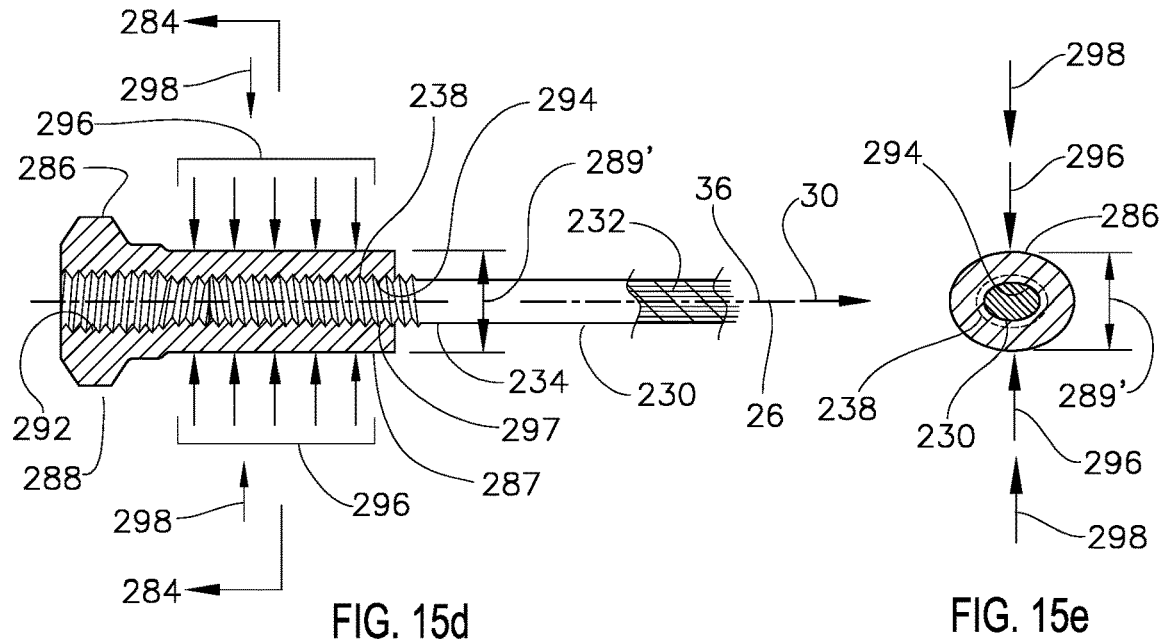
FIG. 15d                    FIG. 15e

FIBER REINFORCED TENSILE ELEMENT

CROSS-REFERENCE TO RELATED APPLICATIONS

This application claims priority of Provisional Patent Application Ser. No. 62/289,389, filed Feb. 1, 2016.

This application is also a Continuation-In-Part of U.S. patent application Ser. No. 14/641,615, filed Mar. 9, 2015 and issued as U.S. Pat. No. 9,815,321, Which is a Continuation-In-Part of U.S. patent application Ser. No. 12/930,643, filed Jan. 13, 2011 and issued as U.S. Pat. No. 8,985,709, which is a Continuation-In-Part of U.S. patent application Ser. No. 12/806,064, filed Aug. 5, 2010 and issued as U.S. Pat. No. 8,657,387, which is a Continuation-In-Part of U.S. patent application Ser. No. 11/879,333, filed Jul. 17, 2007 and issued as U.S. Pat. No. 7,784,878, which is a Continuation-In-Part of U.S. patent application Ser. No. 10/755,653, filed Jan. 12, 2004 and issued as U.S. Pat. No. 7,357,460, which claims priority of U.S. provisional patent application Ser. No. 60/439,819, filed Jan. 13, 2003.

BACKGROUND OF THE INVENTION (1) Field of the Invention

The present invention relates to a fiber reinforced longitudinal tensile element that includes an engagement surface for connection with a bracing element. The present invention is particularly related to the spoke of a vehicle wheel, where the bracing element comprises the rim or hub of the vehicle wheel.

(2) Description of the Related Art

Heretofore, the vast majority of bicycle wheels have been constructed using steel wire spokes with one headed end for connection with the bicycle hub and an opposing end that is directly threaded to accept a spoke nipple that engages the rim. By adjusting the threaded connection between the spoke and the nipple, the overall length of the spoke may be shortened or lengthened to create a balanced pretension in the spokes of the wheel.

Bicycle spokes serve as structural tensile elements where the tension of the spoke is resisted by the hoop compression of the outer rim hoop to create a remarkably efficient wheel structure for handling the loads associated with the operation of the bicycle. The technology of conventional bicycle spokes has remained unchanged for the better part of a century.

Cyclists are continually striving to reduce the weight and increase the efficiency of their bicycle, especially rotating components such as the bicycle wheel. However, the steel spokes of conventional bicycle wheels are quite heavy and add significant weight to the wheel assembly.

In addition to their excessive weight, steel bicycle spokes have poor vibration-damping characteristics and tend to be very efficient at transmitting road vibration to the rider. By transmitting vibration, rather than absorbing it, the conventional steel-spoke bicycle wheel lacks in rider comfort and control.

In attempt to reduce weight, many makers of high-end wheels have resorted to forming their spokes from thinner gage steel wire. This causes the stress in the spoke to increase and makes the wheel more prone to spoke failure due to fatigue. The thinner steel wire has lower tensile stiffness, which can contribute to a reduced side-to-side stiffness of the wheel.

In the last 30 years, great strides have been made in the development of very lightweight materials that also have excellent tensile characteristics. Some of the most attractive of these materials include high-strength fibers, such as carbon fiber, aramid fiber, liquid crystal fiber, PBO® fiber and the like. However, when attempting to utilize them as spokes in bicycle wheel construction, these fibrous materials are far more difficult to efficiently couple or terminate than their conventional steel-wire counterparts. In the few cases where these high strength spokes have successfully been utilized in bicycle wheels, their cost and complexity has been very great. This is the primary reason that the vast majority of bicycle wheels are still constructed using steel spokes.

While there have been some attempts to produce fiber reinforced spokes for bicycles, these spokes have been molded as a complete unit. In the case where thermoset matrix resins are utilized, this results in very long molding cycles because the fiber must be carefully layed up and the resin needs long residence time in the mold in order to catalyze and harden. Also, since the entire spoke is molded, the corresponding mold tool is very large and expensive. Further, since the cycle times are slow, a large number of these tools are required in order to achieve sufficient production throughput. Alternatively, in the case of molding a single thermoplastic spoke (such as U.S. Pat. No. 5,779,323), this is commonly achieved through injection molding, a fluid flow process that only accommodates short reinforcement fibers and not the continuous fibers as defined herein. These short fibers have far inferior tensile properties in comparison with continuous fibers.

Accordingly, it is an objective of the present invention to overcome the forgoing disadvantages and to provide a spoke and/or tensile element and a connection system for such spoke and/or tensile element that is strong, lightweight and inexpensive to produce.

It is a further object of the present invention to facilitate the utilization of high strength fiber-reinforced materials in spoke and/or tensile element construction and to create a high strength connecting system for such spokes and/or tensile elements.

It is a still further objective of the present invention to provide a connection system for spokes and/or tensile elements that has minimal mechanical complexity and is easily serviceable, and permits easy installation and removal of such spokes and/or tensile elements.

Further objects and advantages of the present invention will appear hereinbelow.

SUMMARY OF THE INVENTION

In accordance with the present invention, it has now been found that the forgoing objects and advantages may be readily obtained.

The present invention comprises a longitudinal tensile element such as a spoke, having an end portion, a longitudinal axis, and a cross-section thereof, a bracing element (as defined herein), and a tensile axis of applied tensile load along the span of the spoke. The spoke is connected to the bracing element. The spoke is advantageously made of fiber-reinforced material. The spoke includes a laterally outwardly projecting spoke engagement surface formed therein to provide an overlie engagement with the connector to support tensile load. The spoke preferably includes at least two longitudinally spaced spoke engagement interfaces resulting in a longitudinal engagement interface with the bracing element. The spoke may be directly connected to the bracing element or it may be connected to the bracing element by means of an intermediate connector, where the spoke is connected to the connector and the connector s connected to the bracing element.

A first aspect of the present invention relates to the spoke comprised of reinforcement fibers in matrix. The fibers may impart the majority of the tensile properties of the spoke, while the matrix serves to support and bind the fibers. One preferable matrix material consists of a thermoplastic polymer resin. Thermoplastic polymer may be heated and softened to a softened state with increased plasticity and pliability so that the material may be plastically deformed to a desired contour and then cooled to its original temperature so that this contour is "frozen" and integrated into the spoke. Another potential matrix material is a thermoset resin. Some thermoset resins, when carefully heated above its glass transition temperature, may be softened and plastically deformed to the desired contour in a manner similar to that described above for thermoplastic resins. Another potential matrix material is a metallic material, such as an aluminum or magnesium alloy, which may also be temporarily heated, softened, and plastically deformed in a manner similar to that described above for thermoplastic resin. As a general rule, the matrix has a lower softening temperature than the reinforcement fibers. It is preferred that the fiber strands remain unbroken or only minimally damaged during this forming process. By heating a localized region of the spoke rod, the matrix may be softened to increase its plasticity while the fiber remains undamaged. This temporary increase in plasticity may preferably permit the fibers to deflect somewhat as the matrix is deformed so that the fibers remain unbroken by this process. This is in contrast to a cold-forming process where the spoke rod is deformed at room temperature (i.e. the service temperature of the spoke) without increased plasticity, where the fibers are frozen within the matrix, and these fibers may be more easily fractured or damaged by such a forming process. This localized region corresponds to only a portion of the spoke rod, which is in contrast to heating the entire spoke rod.

In an advantageous embodiment, the reinforcement fibers are aligned to be parallel to the tensile axis. In a further advantageous arrangement, the fibers are at least 4 mm in length or are, more advantageously, continuous and generally extend the length of the spoke. In a further advantageous embodiment the fibers extend continuously to span between the engagement surface and the span portion. Such fiber-reinforced spokes may have very high tensile properties at a much lower weight than conventional steel or metallic spokes, thus providing a significant weight savings to the wheel assembly. The spoke(s) may be produced by drawing, extruding, pultruding, machining, molding, forging, casting, among many other fabrication processes well known in industry.

The spoke is initially pre-formed as a long slender rod of generally constant cross section along its length. One preferable method of producing this pre-formed rod is the pultrusion process, which has minimal waste and is very cost efficient and provides continuous fibers along the length of the rod. Through the temporary application of heat and pressure, a localized portion of the spoke rod is softened and plastically deformed to mold the spoke to provide a configured external surface therein to include a laterally projecting engagement surface. Subsequently, the spoke is cooled and solidified such that this engagement surface serves to provide an overlie engagement to connect the spoke to the bracing element. The overlie engagement provides a structural connection between the spoke and the bracing element to support spoke tension forces.

A second aspect of the present invention relates to the geometry of the engagement surface. The engagement surface may surround and circumscribe the cross section of the spoke about the longitudinal axis (as defined herein). The engagement surface may only partially circumscribe the cross section of the spoke. The engagement surface may be flat or may be angled or may be rounded or may have any other laterally projecting contour. The configured surface may include a singular engagement surface at a single longitudinal position or it may include a multiplicity of longitudinally spaced engagement surfaces at a multiplicity of longitudinal positions to provide a longitudinal engagement interface (as defined herein) for connection with the rim and/or hub. The engagement surface(s) provides an overlie engagement with the rim and/or hub and/or an intermediate connecting element to support and resist spoke tension forces. A longitudinal engagement interface may be preferable since the associated multiplicity of overlie engagements tend to distribute the contact stress over these multiple engagements.

A third aspect of the present invention relates to the connection between a connector and the spoke. The connector preferably includes a first portion and a second portion thereof, where the lateral distance between the first and second portions is reduced and/or contracted to retain the spoke to the connector and to maintain an overlie engagement between the spoke and at least one of the first and second portions. At least one of the first and second portions may include a cavity to receive the spoke. The first and second portions are most commonly laterally opposed to each other. The first and second portions may be two portions of a singular connector element. Alternatively, the connector may be a multi-piece connector composed of a multiplicity of discreet segments, where a first segment includes the first portion and the second segment includes the second portion. In addition to retaining the spoke, the lateral contraction between first and second portions may serve to laterally sandwich and clamp the spoke to maintain a lateral pressure between the spoke and the first and second portions. Preferably, this lateral pressure occurs along at least a portion of the longitudinal engagement to press the mating longitudinal engagement surfaces into intimate contact. The overlie engagement provides a structural connection between the spoke and the bracing element to support spoke tension forces.

A fourth aspect of the invention relates to the overlie engagement between a connector and the spoke. This overlie engagement is preferably a longitudinal engagement (as defined herein) between a longitudinal engagement surface of the spoke and the longitudinal engagement surface of at least one of the first and second portion of the connector. The longitudinal engagement may be utilized to provide a highly efficient structural connection between the spoke and the bracing element to support spoke tension forces.

The present invention obtains many advantages. One advantage of the present invention is the ability to utilize lightweight materials for the spoke while minimizing the cost and expense of the completed assembly.

Another advantage of the present invention involves the deformation in only a localized region of the spoke rod. This allows the spoke rod to me manufactured in a highly efficient and low cost manner, such as pultrusion. Deforming only a small localized region of the spoke rod requires only minimal heating energy and may be achieved quickly with a minimum of labor and tooling. The tooling is also smaller in size and correspondingly low in cost. This is in contrast to the alternative of deforming and/or molding the entire spoke as a single unit, which requires greater heating energy, greater cycle times, increased labor, and larger and costlier tooling.

The present invention may be readily adapted to lightweight fibrous spoke reinforcement fibers, such as carbon fiber, aramid fiber (such as Kevlar®), LCP (liquid crystal fiber such as Vectran®), PBO (polyphenylenebenzobisoxasole fiber such as Zylon®), polyethylene fiber (such as Spectra®) and the like. These fibers are impregnated within a matrix to create a spoke and/or tensile element that has a significant performance improvement over the steel spokes they commonly replace. In comparison with the steel wire commonly used in spoke construction, these fiber reinforced materials have equivalent or greater tensile strength than the steel spoke at a much lower density. This allows for the construction of a much lighter spoke and a lighter wheel. Further, these materials have significantly better vibration-damping characteristics than steel to reduce the vibration experienced by the rider and to provide greater rider comfort and control. Still further, these materials also have excellent tensile fatigue properties to reduce or even eliminate spoke failures due to fatigue.

The embodiments described herein are highly effective at transmitting tensile loads between the spoke and the bracing element and may be designed to provide a structural connection that is strong as or stronger than the spoke itself. The embodiments described herein are highly effective at producing a lightweight and high-performance vehicle wheel at an economical cost.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 2b is a cross-section view of the prior art bicycle wheel as seen generally in the direction 15-15 of FIG. 2a;

FIG. 3b is a partial cross-section view of the bicycle wheel of FIG. 3a as viewed generally in the direction 20-20 of FIG. 3a;

FIG. 4b is an orthogonal view of the spoke of FIG. 4a;

FIG. 5b is an orthogonal view of the spoke of FIG. 5a;

FIG. 6b is an orthogonal view of the spoke of FIG. 6a;

FIG. 7b is an orthogonal view of the spoke of FIG. 7a;

FIG. 8b is an orthogonal view of the spoke of FIG. 8a;

FIG. 9a shows the spoke rod in cross section and extending into a mold, prior to forming the spoke end;

FIG. 9b shows the spoke end as formed in the mold to create an enlarged portion or head;

FIG. 9c shows the resulting formed spoke, including the enlarged portion;

FIG. 11d is a partial cross section view, taken along 104-104, of the of an alternate version of the embodiment of FIG. 11a, without an axial gap remaining between the clamping member and the hub flange;

FIG. 11e is a partial cross section view, taken along 104-104, of the embodiment of FIG. 11a, with an axial gap remaining between the clamping member and the hub flange;

FIG. 12 is a partial perspective exploded view of a twelfth embodiment of the present invention, including a hub flange with a cavity to receive and engage the spokes and a screw to laterally sandwich and clamp the spokes where the spokes have a configured surface on one face;

FIGS. 13a-c are partial perspective views of a thirteenth embodiment of the present invention, and showing a sequence of operations involved in connecting the spoke to the bracing element;

FIG. 13a is an exploded view showing the spoke connection prior to assembly, including two connecting elements and a retaining sleeve, including pre-formed internal ribs of the connecting elements and pre-formed external ribs of the spoke;

FIG. 13b is an exploded view showing the connecting elements pre-assembled to the spoke;

FIG. 13c shows the fully assembled spoke connection with the retaining sleeve assembled to retain the connecting elements to the spoke and the retaining elements with an overlie engagement with the bracing element;

FIG. 13d is a radial cross section view, taken along 265-265, of the embodiment of FIG. 13a in an assembly sequence corresponding to FIG. 13c;

FIG. 15a is a partial cross-sectional exploded view of a fifteenth embodiment of the present invention, including pre-formed internal threads of the connector and pre-formed external threads of the spoke, also showing continuous reinforcement fibers;

FIG. 15b is a partial cross-sectional view of the embodiment of FIG. 15a, showing a first assembly sequence where the spoke is threadably pre-assembled to the connector;

FIG. 15c is a cross section view of the embodiment of FIG. 15a, taken along 285-285, corresponding to the assembly sequence of FIG. 15b;

FIG. 15d is a partial cross-sectional view of the embodiment of FIG. 15a, showing a second assembly sequence where the connector is crimped such that internal threads are further engaged to external threads in a longitudinal engagement;

FIG. 15e is a cross section view of the embodiment of FIG. 15a, taken along 284-284, corresponding to the assembly sequence of FIG. 15d;

FIG. 17a shows the spoke connection prior to assembly, including two connecting elements and a bracing element with a tapered opening, and including pre-formed internal ribs of the connecting elements and pre-formed external ribs of the spoke;

FIG. 17b shows a first assembly step where the connecting elements are pre-assembled to the spoke;

FIG. 17c shows the fully assembled spoke connection in a second assembly step with the connecting elements nested and wedging in the tapered opening to connect the spoke to the bracing element;

FIG. 18a shows the two spokes prior to assembly, including a coupling sleeve;

FIG. 18b shows a first assembly step where the two spokes are pre-assembled to each other in a longitudinal overlap with an engagement interface therebetween;

FIG. 18c shows a second assembly step where the sleeve is installed to surround the engagement interface, to restrict lateral displacement between the spokes, and to maintain the longitudinal engagement.

DETAILED DESCRIPTION OF THE INVENTION

Figure 1:
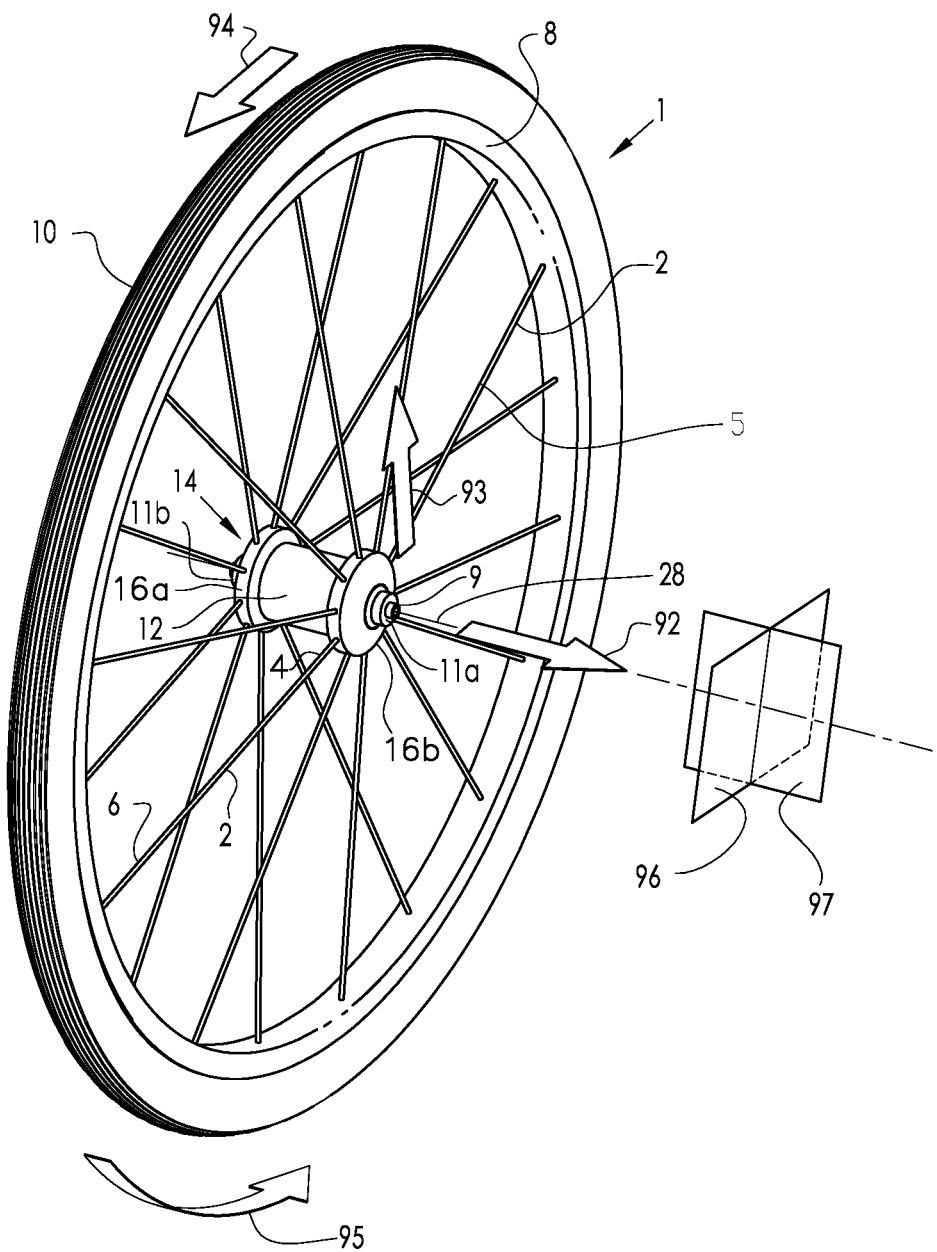
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the bicycle frame and the quick release skewer assembly are not shown in this figure. The hub shell 14 is rotatable about the axle 9 and includes at least two axially spaced hub flanges 16a and 16b, each of which include a means for connecting with the spokes 2, with a hub body portion 12 therebetween. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An orientation that is radially inboard (or inward) is nearer to the axial axis 28 of rotation and a radially outboard (or outward) is further from the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11a and 11b. Conversely, an axially outwardly facing surface is a surface that faces away from the axial midpoint between the two end faces 11a and 11b. While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be adapted or otherwise applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2b. Additionally, a tension-spoke wheel will usually be pretensioned during assembly to create a pretensioned structure of balanced spoke tension that allows the axle supporting loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral or side-to-side loads, only a single hub flange may be employed.

Figure 2A:
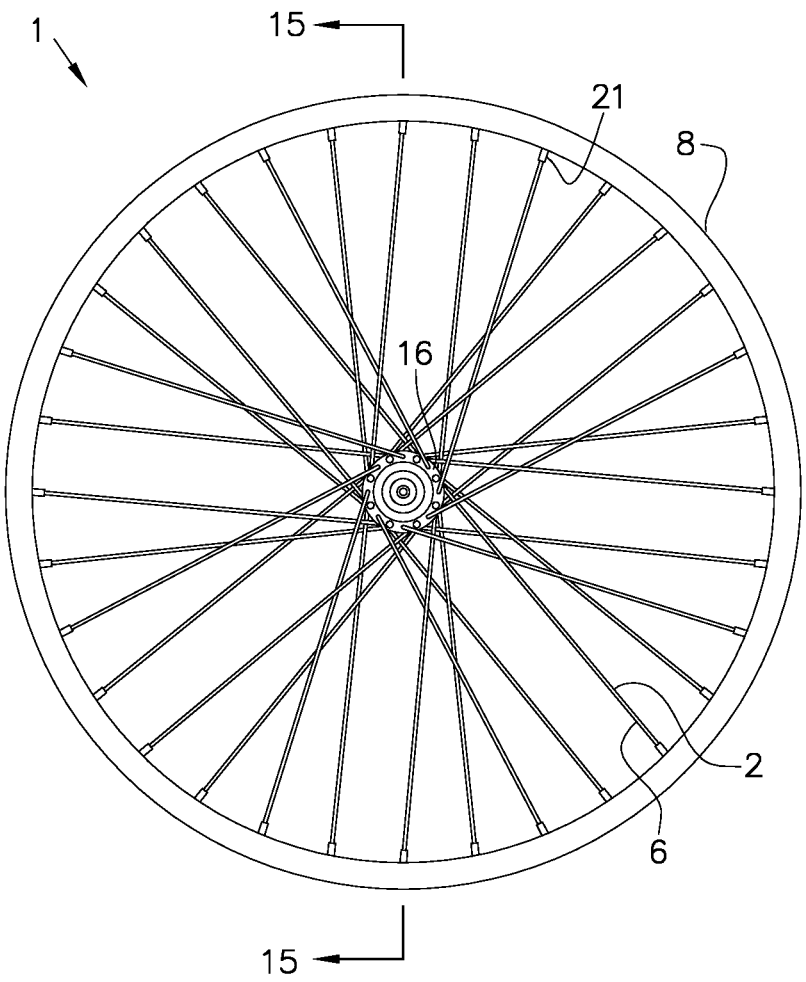
FIG. 2a is an axial plan view illustrating a prior art bicycle wheel.
Figure 2B:
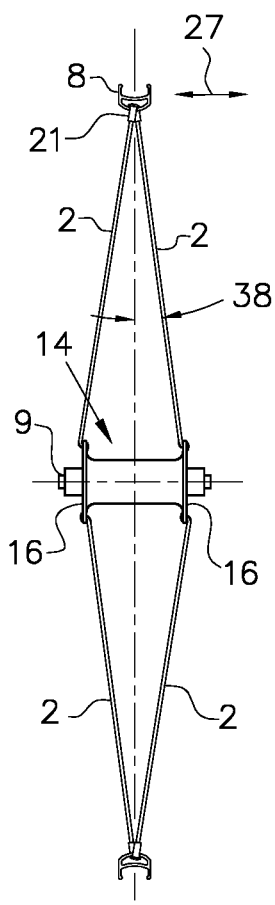
Figure 2C:
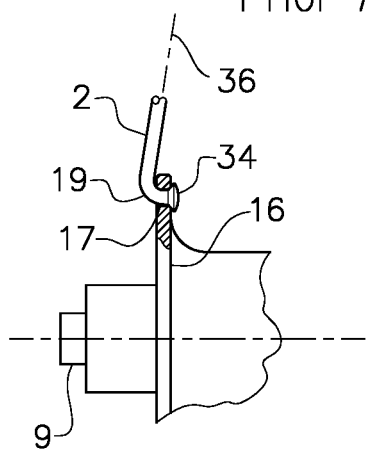
FIG. 2c is a fragmentary view detailing the view illustrated in FIG. 2b where the hub flange is shown in a partial cross-section to illustrate the connection with the spoke.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of pre-tension is induced in the spoke 2. By selectively adjusting this threaded engagement, the spoke pre-tension may be adjusted to align the trueness of the rim 8. The spoke pre-tension is resisted by circumferential compression of the rim 8 and it is this balance of forces that imparts efficient structural integrity to the bicycle wheel 1. Also shown in FIG. 2b is bracing angle 38 between the radial centerline plane of the rim 8 and the tensile axis 36 of the spokes 2. As this bracing angle 38 is increased, the lateral or side-to-side stiffness (i.e. stiffness in the axial direction 27) of the wheel 1 is also increased.

Figure 3A:
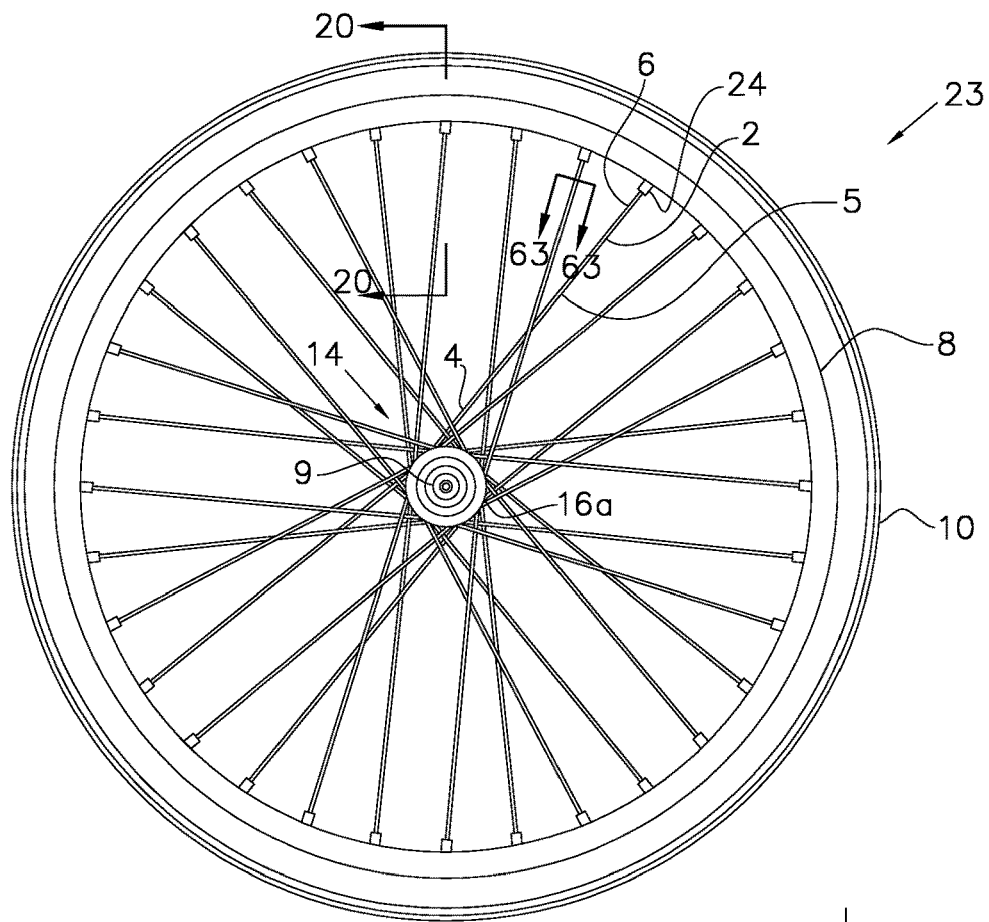
FIG. 3a is a plan view of a first embodiment of the present invention, illustrating a bicycle wheel including collars or connecting elements, each serving as a termination for the corresponding spoke.
Figure 14A:
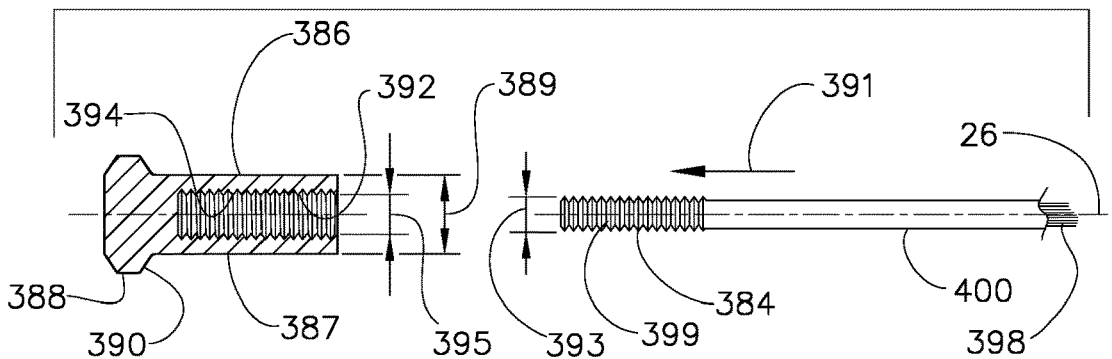
FIG. 14a is a partial cross-sectional exploded view of a fourteenth embodiment of the present invention, including pre-formed internal ribs of the connector and pre-formed external ribs of the spoke.
Figures 14B, 14C:
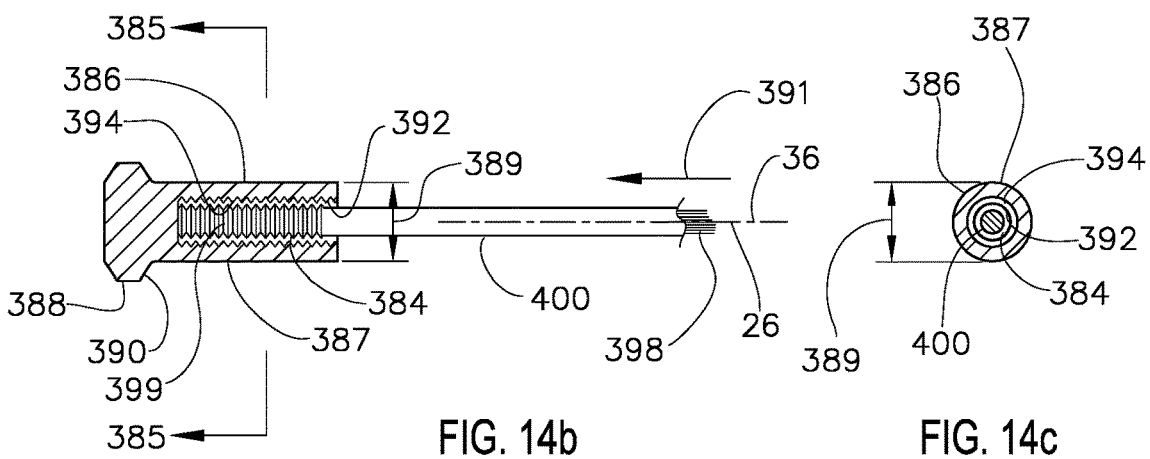
FIG. 14b is a partial cross-sectional view of the embodiment of FIG. 14a, showing a first assembly sequence where the spoke is pre-assembled to the connector.
FIG. 14c is a cross section view of the embodiment of FIG. 14a, taken along 385-385, corresponding to the assembly sequence of FIG. 14b.

FIG. 3a shows an exemplary bicycle wheel 23 that corresponds to some of the embodiments described herein, such as the embodiment of FIGS. 14a-c and the embodiment of FIGS. 15a-c. FIG. 3a is shown to provide a generic assembly to illustrate an arrangement wherein the present invention may be adapted to utilization in bicycle wheel construction. The bicycle wheel 23 includes spokes 2, hub 14, rim 8, and tire 10. The hub 14 includes hub flanges 16a and 16b (obscured) and axle 9. The rim 8 includes geometry for mounting of a tire 10 and a multiplicity of spoke holes 22 in its spoke bed wall 33, each to accept an individual connector 24. It is noted that the rim 8 shown here is an exemplary representation of a bracing element that may serve as a rim or a hub flange and may take on a wide range of forms. The spokes 2 are constructed of fiber-reinforced material and are connected at their first end 4 to their associated hub flange 16a and/or 16b (obscured) and at their second end 6 to the rim 8 and have a span portion 5 therebetween.

To create a solid connection between the spoke 2 and the rim 8, the second end 6 of each fiber reinforced spoke 2 is first connected to a corresponding connector 24 at an engagement interface 25 as described variously within the instant disclosure. The connector 24 may otherwise be utilized to laterally sandwich and engage the second end 6 of the spoke 2 by means of a laterally overlying engagement interface 13 between the connector 24 and the second end 6 in a manner similar or identical to one of the embodiments of the present invention. The connector 24 shown here includes a shank portion 29, a head portion 31, and a transition surface 32 therebetween as shown in FIG. 3b, which is a detail view of the embodiment described in FIG.

3a and which shows the rim 8 in cross-section. As shown in FIG. 3b, shank portion 29 extends through spoke hole 22, with transition surface 32 serving as an engagement surface to bear against the radially outboard surface 35 of the spoke bed wall 33 in an overlie engagement, which provides blocking engagement to resist spoke tension 30. It should be noted that, the transition surface 32 provides engagement geometry to engage the connector 24 to the bracing element (rim 8).

Figure 3B:
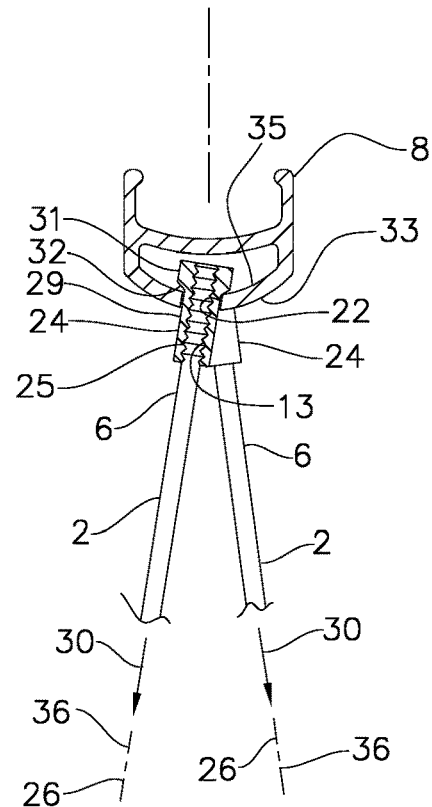

The connector 24 of FIGS. 3a-b is generally shown to serve as a termination to the spoke 2 as a means to connect or anchor the spoke 2 to a bracing element (i.e. rim 8). Note that the span of spoke 2 is aligned in the direction of spoke tension 30 and along the tensile axis 36, which extends through the longitudinal axis 26 of the spoke 2. FIG. 3a shows that several spokes 2 of the wheel 7 may be terminated at the rim 8 in this manner. The connector 24 may alternatively be connected to the first end 4 of the spoke 2 for connection to the hub 14. For simplicity in describing this embodiment, the connector 24 is shown here to connect the second end 6 to the rim 8, with the understanding that such an embodiment may be easily adapted to alternatively connect the first end 4 to the hub flange 16a or 16b (obscured) as well.

It is understood that FIGS. 3a-b corresponds to a simplified arrangement for illustration purposes. Several of the embodiments of the present invention may be applied to this arrangement, as well as arrangements which include facility for creating and/or adjusting spoke pre-tension, as described in FIGS. 2a-c.

The present invention comprises a spoke, which may be considered as a longitudinal tensile element having an end portion and a cross-section thereof, a bracing element, and a tensile axis of applied tensile load along the longitudinal tensile element. The longitudinal tensile element is connected to the bracing element by means of an engagement at an engagement interface between the longitudinal tensile element and a connecting element. The connecting element may be an intermediate element (such as connector 24) where the spoke 2 is connected to the connecting element 24 and the connecting element is connected to the bracing element 8 or the connecting element may be integral with the bracing element (as described in FIGS. 11a-e and FIG. 16, for example) where the spoke is directly connected to the bracing element, which also includes geometry to engage and mate with the spoke. In the embodiments shown herein, the longitudinal tensile element is a vehicle wheel spoke 2, the hub flange 16a and/or 16b constitutes a first bracing element and the outer rim 8 constitutes a second bracing element.

The spoke 2 is a generally long slender tensile element with a longitudinal length greater than its lateral width. The spoke 2 includes a longitudinal axis 26 through the center of the spoke 2, along its length and generally parallel to its sidewalls. The longitudinal tensile element (i.e. spoke) includes external sidewall surface(s) that extend generally along its length. As such, the longitudinal axis 26 is generally parallel to the sidewall surface. The spoke 2 also has a tensile axis 36 of applied tensile load 30 that extends along the span portion 5 of the spoke 2 between its anchor points at the rim 8 and hub flange 16a or 16b. The tensile axis 36 is generally collinear to the longitudinal axis 26, except where the spoke 2 is bent to deviate from the tensile axis 36. For the purposes of definition, as relating to spokes and connections thereto, the term "longitudinal" herein refers to alignment along the longitudinal axis 37. A longitudinally inboard (or inward) orientation refers to an orientation proximal the midpoint of the span portion 5. Conversely, a longitudinally outboard (or outward) orientation refers to an orientation distal the midpoint of the span portion 5. The term "lateral" refers to alignment in a direction generally perpendicular to the longitudinal axis 37. A laterally inboard (or inward) orientation refers to an orientation proximal the longitudinal axis 26 (i.e. centerline of the spoke 2). Conversely, a laterally outboard (or outward) orientation refers to an orientation laterally distal the longitudinal axis 26. The term "longitudinal axis" is generally interchangeable with the term "tensile axis", unless otherwise noted. When referring to a spoke, the term "cross section" refers to a virtual cross sectional cut perpendicular to the longitudinal axis 26 along 63-63 of FIG. 3a and the term "circumferential" refers to a vector that wraps circumferentially about the longitudinal axis 26.

Some examples of a longitudinal tensile element include the spoke of a vehicle wheel, a guy wire, a control cable, or a structural tendon component, among others. In most of the embodiments of the present invention, the longitudinal tensile element is capable of supporting tension, otherwise known as positive tensile loading, along its length. However, the tensile element may alternatively support compression, otherwise known as negative tensile loading, along its length, where the longitudinal tensile element provides columnar support between two bracing elements. The span portion of the spoke is considered as the portion of the spoke that is under tension and that extends between its anchor points and/or engagements at the bracing elements (i.e. hub and rim). A location outboard of the spoke span is a location along the tensile axis 36 and/or longitudinal axis 26 that is longitudinally beyond, outward, or external to the span portion.

The spoke has longitudinal external sidewall surface(s) that may be generally parallel to the longitudinal axis and an end face that is generally perpendicular to the sidewall surface. With a slender spoke, the sidewall tends to have far greater available surface area than its end face. Since an engagement interface of greater surface area tends to provide a more robust connection, it is often preferable to provide an engagement interface that extends longitudinally along the sidewall surface and preferably by a longitudinal length at least twice the cross sectional thickness of the spoke. This is in contrast to conventional spoke arrangements that focus these loads on a singular longitudinal point or region of contact, as with conventional prior art wheel assemblies.

A longitudinal engagement is defined herein as an engagement that includes a continuous longitudinal engagement interface or, as particularly described herein, a longitudinal engagement that includes at least two engagement interface locations that are longitudinally spaced along the longitudinal axis of the spoke. The engagement interface may include a multiplicity of individual overlie engagements between the spoke and a connecting element that are longitudinally spaced to support spoke tension loads between the spoke and the connecting element. For example, a longitudinal engagement may include a configured or knurled surface of the spoke comprised of a multiplicity of laterally projecting engagement surfaces that are longitudinally spaced to have a mating overlie engagement with a configured or knurled surface of the connecting element that is also comprised of a multiplicity of laterally projecting engagement surfaces to support spoke tension forces therebetween. It is preferred that, when viewed in a lateral direction, a plan view shows the engagement surface associated with these projections to extend generally circumferentially in a direction that crosses the longitudinal axis or, in other words, extends in a direction generally perpendicular to the direction of spoke tension load.

It is generally desirable that the longitudinal length of such a longitudinal engagement be greater than the cross-sectional thickness or width of the spoke to create an effective engagement. Obviously, increasing the longitudinal length of engagement and/or the number of longitudinally spaced engagement surfaces will increase the combined interface surface area and will therefore increase the load carrying capacity of the engagement interface and joinder between the connecting element and the spoke. It is preferable to have a longitudinal length of engagement at least twice the lateral thickness of the spoke.

The longitudinal engagement may be very effective at distributing the spoke tension load among a multiplicity of engagement interfaces, and thus reduce the contact stresses, at any single engagement interface. Since spokes made of reinforced polymer materials tend to have lower surface hardness than steel spokes, they may not be able to support very high contact stresses without deformation or damage. As such, the longitudinal engagement is particularly applicable to these fiber reinforced spokes since it distributes the load across a multiplicity of engagement interfaces. These fiber reinforced spokes are particularly advantageous, since these materials tend to have the desirable qualities of very high strength combined with light weight. However, heretofore these materials have been difficult to apply to conventional spoke connection systems that are generally focused on construction and connections that are based on spokes of metallic materials.

A configured surface is defined herein as a region of variable surface geometry that includes laterally outwardly projecting raised contour(s) and adjacent laterally inwardly recessed or relieved contour(s) (relative to the raised contour (s)) to include a laterally outwardly projecting engagement surface adjacent the transition between these raised and relieved contours. Some examples of configured surfaces include surfaces that are threaded, knurled, ribbed, headed, raised, indented, warped, bent, etc. The embodiments described herein disclose a variety of configured surfaces and corresponding longitudinally spaced engagement surfaces, such as a ribbed surface, a helical threaded surface, and others. The engagement surfaces may be individual discontinuous surfaces, such as the flanks of ridges 198a and 198b of FIGS. 5a-b or they may be continuous surfaces, such as the flanks of a continuous thread ridge 241 of the helical thread described in FIGS. 7a-b. Thread ridge 241 wraps continuously around the longitudinal axis 26 such that, when viewed in a lateral direction, the plan view shows the thread ridge 241 to cross the longitudinal axis 26 multiple times to effectively create a multiplicity of longitudinal spaced engagement surfaces. It is may be preferable that the engagement surface crosses the longitudinal axis 26 (rather than parallel to the longitudinal axis 26) in this way since this orientation corresponds to a blocking overlie engagement interface to support and resist spoke tension 30 forces.

The longitudinal engagements described herein utilize a connecting element with a pre-formed configured surface that includes a series of longitudinally spaced engagement surfaces and a spoke with a pre-formed configured surface that includes a series of longitudinally spaced engagement surfaces. The longitudinal engagement surfaces of the connecting element and of the spoke are preferably nested and laterally pressed together, forcing these engagement surfaces into intimate contact and increasing the lateral overlying depth of the overlie engagement. These nested engagement surfaces create a series of laterally extending overlie engagements in a longitudinal engagement interface that serves to firmly connect the spoke to the connecting element and to support spoke tensile loads therebetween. Further, by pressing and forcing these engagement surfaces into intimate contact, a considerable level of friction may also be maintained between these surfaces, which further augments this connection and its ability to resist spoke tensile loads therebetween.

The configured surfaces of the bracing element (or a connector connected thereto) and the spoke, as described herein, are pre-formed configured surfaces where both configured surfaces and their corresponding engagement surfaces are pre-formed prior to their assembly and connection together. This is in contrast to U.S. Pat. No. 7,862,128, which describes a deformed longitudinal engagement, where only one of the configured surfaces is pre-formed while the opposing surface is deformed on contact with the pre-formed surface in a deformed engagement. The deformed engagement has several shortcomings in comparison with the present invention. Firstly, the deformed engagement requires that the pre-formed surface be significantly harder than the deformed surface in order to create this deformation. This requires materials with high hardness, such as steel or other metallic materials, that may be costly and are likely very heavy. Secondly, this deformation-upon-assembly may likely be less effective at creating a well-defined engagement surface in the surface being deformed. This may correspondingly reduce the tensile loads that may otherwise be carried. Thirdly, this deformation results in very high contact stresses in both the pre-formed surface and the deformed surface. The high contact stresses may weaken these components adjacent the deformation site. For example, this contact stress may create micro-fractures in one or both of these components, which may further reduce the tensile loads that may otherwise be carried.

By having both configured surfaces pre-formed prior to their longitudinal engagement therebetween, as described in the instant invention, the resulting connection therebetween may be lighter, more robust, and more economical than the arrangement of U.S. Pat. No. 7,862,128. Firstly, the longitudinal engagement may be achieved without requiring one or the other component to have especially high hardness. This may reduce weight and/or cost as compared to U.S. Pat. No. 7,862,128. Secondly, since the configured surfaces may both be formed off-line in a purpose-built and controlled process, the engagement surfaces may be exceptionally well defined and contoured, resulting in a very highly effective longitudinal engagement therebetween with greater tensile load-carrying capacity. Thirdly, since the configured surfaces do not have the exceptionally high contact stresses associated with deformation, these components may not be weakened or overstressed when they are pressed into connection.

While a conventional threadable engagement between an externally threaded rod and an internally threaded hole may be considered as a longitudinal engagement, there must necessarily be some internal clearances therebetween to permit these two components to be threadably assembled. As such, the mating threaded surfaces are not pressed into intimate contact. The present invention includes a lateral displacement of one or both of the mating configured surfaces to reduce clearances therebetween and preferably press and force these two surfaces into intimate contact. This reduced clearance serves to greatly increase the tensile load carrying capacity of this longitudinal connection. This also permits the use of softer material(s) and softer configured surface(s), such as fiber-reinforced resins (i.e. composites), in such a longitudinal connection. For example, while carbon fiber reinforced polymer has very high structural performance characteristics, it is also a relatively soft material, especially in comparison to most metals. By laterally pressing a configured longitudinal engagement surface of carbon fiber reinforced polymer into intimate contact with a mating configured longitudinal engagement surface, a highly effective connection therebetween may be achieved to carry sufficient tensile loads. In the absence of such a laterally pressed longitudinal engagement (i.e. a conventional threadable engagement with comparatively large clearances therebetween), the tensile load carrying capacity of the connection may be significantly lower.

In order to take advantage of the light weight and high strength of the high-performance fiber-reinforced materials mentioned hereinabove, it may be preferable to incorporate these material(s) in the spoke. These materials tend to be anisotropic and have greater strength along the direction of the fiber. Thus it may be preferable that these fibers are aligned to be parallel to the tensile axis. It is also preferable that these reinforcement fibers be encapsulated in a matrix. While short or discontinuous fibers often provide significant reinforcement to the matrix material, it is preferable that the fibers be as long as possible to provide the greatest overlap with adjacent fibers. The utilization of continuous fibers that extend generally along the length of the spoke provides the highest mechanical properties, especially when these fibers extend between the span portion and the configured surface of the spoke.

A spoke of high strength fibers in a resin matrix has numerous advantages in the present invention. Firstly, the resin matrix adheres the adjacent fibers to each other so that, through a joinder to the external surface of the spoke, the overmolded interface has a connection with all of the fibers of the spoke, which permits the fibers to work together for optimal tensile properties. Further, the resin matrix coats the outside of the pre-formed spoke, which creates an optimal surface for joinder with the connector at the engagement interface.

A bracing element is one that resists or braces against all or part of the load of a tensile element. In other words, in order for a tensile element to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element is that element which the tensile element is pushed against.

In the descriptions provided herein, the term "coupling" identifies an arrangement where a connector serves to provide a structural connection between two tensile elements (i.e. spokes), thus permitting tensile loads to be transmitted from one tensile element to another within the span. A coupling may be considered to provide a connection within the span portion of the spoke or to couple together two spoke portions. In contrast, the term "termination" or "anchor" identifies a connector that serves to provide a means to connect the tensile element (i.e. spoke) at the terminus of its span, either directly or indirectly, to a bracing element (i.e. the hub or rim), to which the tensile element is intended to be anchored.

Figure 3C:
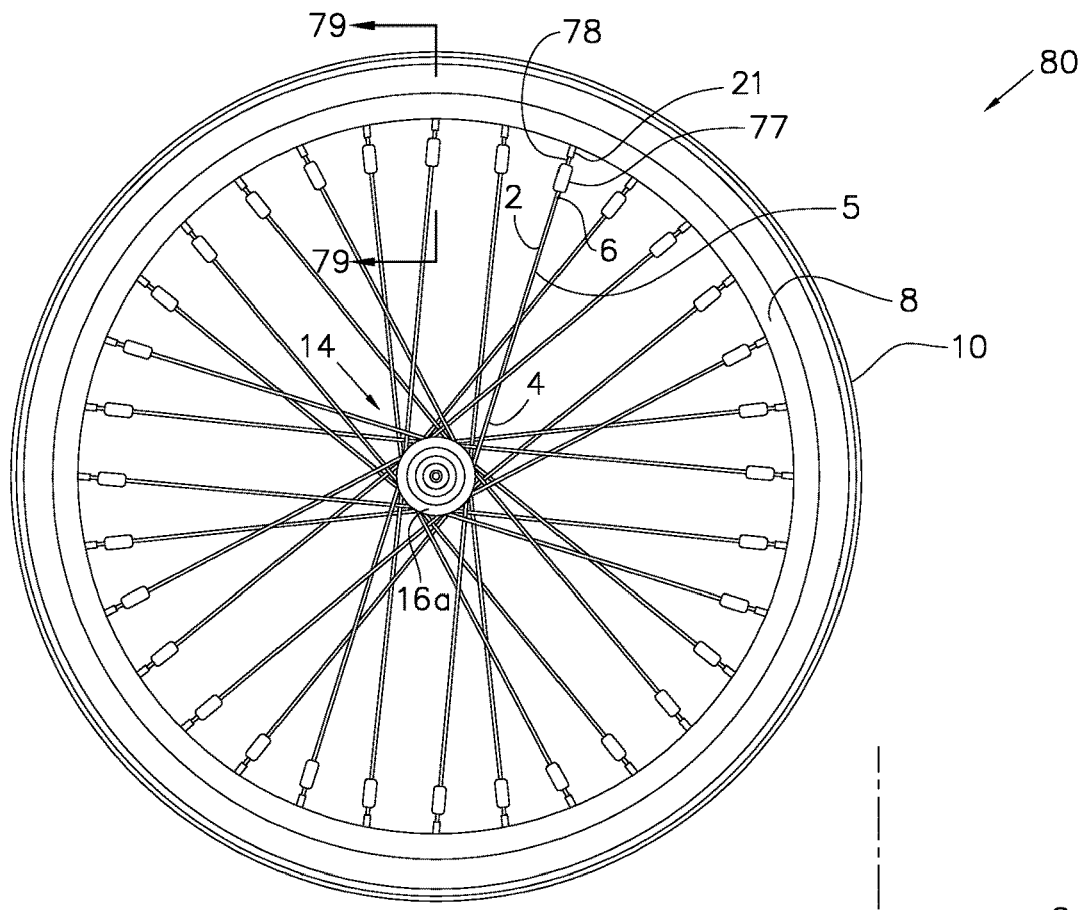
FIG. 3c is a plan view of a second embodiment of the present invention, illustrating a bicycle wheel including coupling collars or connecting elements, each serving as a coupling for the corresponding spoke.
Figure 3D:
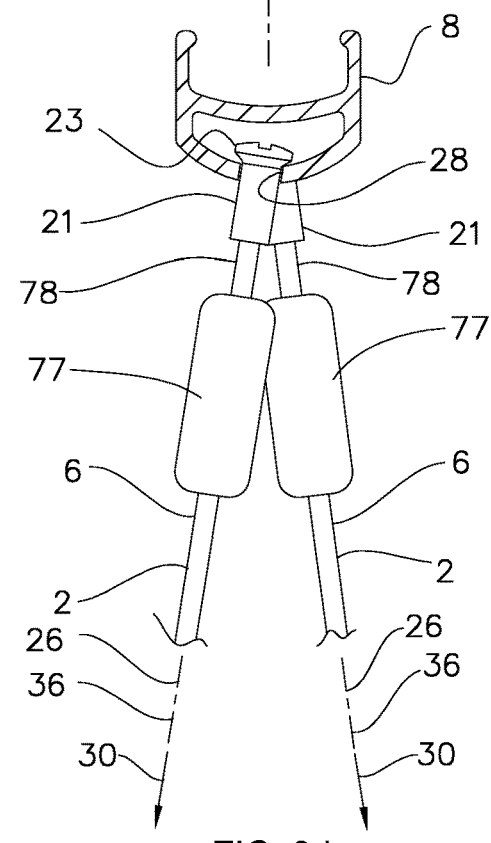
FIG. 3d is a partial cross-section view of the bicycle wheel of FIG. 3c as seen generally in the direction 79-79 of FIG. 3c.

FIGS. 3c-d shows a bicycle wheel 168 similar in most respects to the bicycle wheel 7 of FIGS. 3a-b. However, FIG. 3cd describe a representative arrangement where a coupling is utilized to connect two discreet portions of a spoke to each other. The connector 24 of FIGS. 3a-b is eliminated in favor of coupling collar 77 and fastener 78. The spokes 2 are connected at their first end 4 to the hub 14, and adjacent their second end 6, to coupling collar 77. To create a firm connection between the spoke 2 and the rim 8, the coupling collar 77 is also connected to a threaded fastener 78. The threaded fastener 78 is threadably mated to a spoke nipple 21 to connect with the rim 8 in the conventional manner. Spoke nipple 21 is generally conventional and includes an enlarged head portion 23. It may be seen that the coupling collar 77 serves as a coupling element to join together two tensile elements (i.e. the spoke 2 and the fastener 78). The tire 10 is mounted to the rim 8 in the conventional manner. FIG. 3c shows that all of the spokes of the wheel 80 may be connected at the rim 8 in this manner. The coupling collar 77 and the fastener 78 may alternatively be connected to the first end 4 of the spoke 2 for connection to the hub 14. In such a case, the fastener 78 may be connected to the hub 14 via spoke nipples 21 or it may be directly threaded into mating holes of the hub flange 16a or 16b. Such an arrangement where the spoke 2 is threadably connected directly to the hub flange 16 is well known in industry.

FIG. 3d is a detail of the embodiment described in FIG. 3c and shows the rim 8 in cross-section. The spoke nipple 21 is fitted through hole 28 in the rim 8 and is retained in place by the head portion 23 in the conventional manner. The nipple 21 is of conventional configuration and includes a female threaded central bore that is mated to the male threaded fastener 78. Thus, spoke pretension may be adjusted for each individual spoke by threadably tightening the nipple 21 on the fastener 78, effectively shortening the spoke 2 to induce tension to the spoke 2. Note that the span of spoke 2 is aligned in the direction of spoke tension load 30, including a tensile axis 36 that is aligned in the direction of spoke tension 30 and extends through the longitudinal axis 26 of the spoke 2. The coupling collar 77 serves as a coupling to connect a first tensile element (i.e. spoke 2) to a second tensile element (i.e. fastener 78), where the second tensile element is connected to a bracing element (i.e. rim 8). The coupling collar 77 is connected to the fastener 78 and/or the spoke 2 by means of an overlie engagement interface similar or identical to the broad range of connecting arrangements described herein.

FIGS. 4a-d, 5a-b, 6a-b, 7a-b, 8a-c, 9a-d, and 10a-c describe a variety of embodiments where a spoke rod is locally formed to include a configured surface. All except the embodiment of FIG. 9a-g and 10a-c describe the configured surface as including longitudinal engagement surfaces as defined hereinabove. The spokes of these figures may be made from a wide variety of materials, and are preferably made of composite material, preferably a fiber-reinforced composite material that includes reinforcement fibers in a matrix as described hereinabove. These fibers are preferably continuous fibers, as continuous fibers that extend the full length of the spoke and which tend to afford the highest specific tensile strength. These fibers may be selected from a wide range of reinforcement fiber types well known in industry, including carbon fibers, among others. The matrix may be a metallic material or it may be a polymer resin material such as a thermoplastic or a thermoset resin or it may be another matrix material. It may also be advantageous that the external surface of the spoke include a coating, such as a resin-rich polymer coating to provide protection for the fibers and/or to provide an easily-formable surface for forming the configured surface as described. Since this coating is preferably unitary and/or solidly adhered and integral with the matrix resin, for the purposes of definition herein, such a coating may be considered to be an extension or a portion of the matrix resin.

Figure 4A:
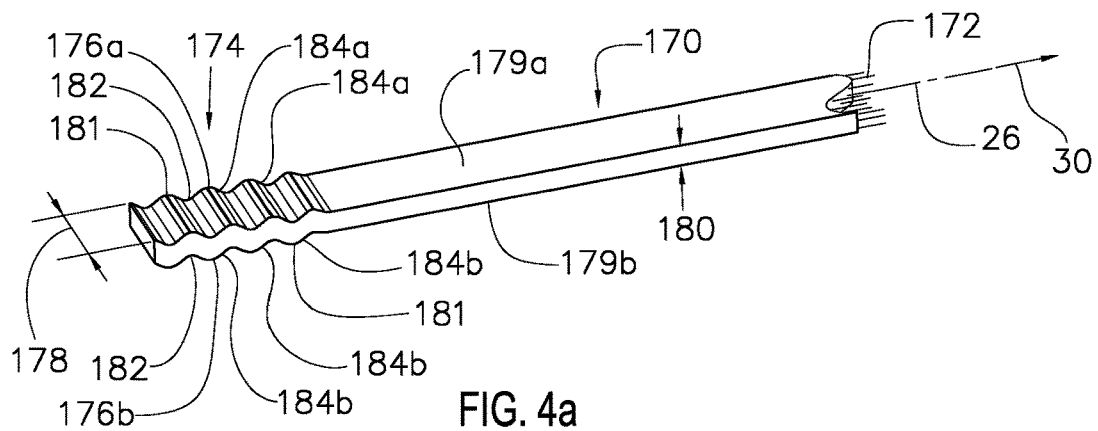
FIG. 4a is a partial perspective view of a third embodiment of the present invention, showing a formed and configured spoke end including a wavy surface to create a series of longitudinal engagement surfaces extending perpendicular to the longitudinal axis.
Figure 4B:
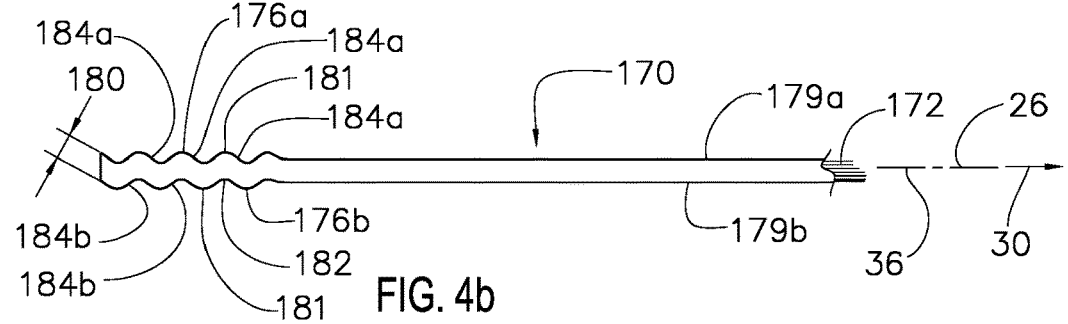

FIGS. 4a-b describe a spoke 170 with reinforcement fibers 172 with an end portion 174 that has configured surfaces 176a and 176b in the form of a wavy and bent configuration. Spoke 170 is shown here to have a generally flat profile with a width 178 along faces 179a and 179b greater than its thickness 180 (between faces 179a and 179b). It may be preferable that this width 178 be at least 1.6 times this thickness 180 for optimal aerodynamics and for greater width of configured surfaces 176a and 176b. The end portion 174 is formed to create a bent and corrugated configured surface consisting of a series of longitudinally spaced kinks or waves, where the cross sectional thickness 180 remains generally unchanged. Thus, end portion 174 includes a series of laterally outwardly projecting peaks 181 longitudinally adjacent a corresponding series of laterally relieved valleys 182. The configured surfaces 176a and 176b correspond to a bent or wavy contour such that the longitudinally spaced peaks 181 of face 179a are longitudinally coincident with valleys 182 of face 179b and vice versa. This wavy profile results in a series of laterally extending and longitudinally spaced engagement surfaces 184a associated with face 179a and similar engagement surfaces 184b associated with face 179b. Engagement surfaces 184a and 184b extend laterally outwardly and laterally opposed to each other and also extend along the width 178 and perpendicular to the longitudinal axis and the direction of spoke tension 30 forces. The bent configured surfaces result in engagement surfaces 184a and 184b that are longitudinally staggered as shown.

Figure 4C:
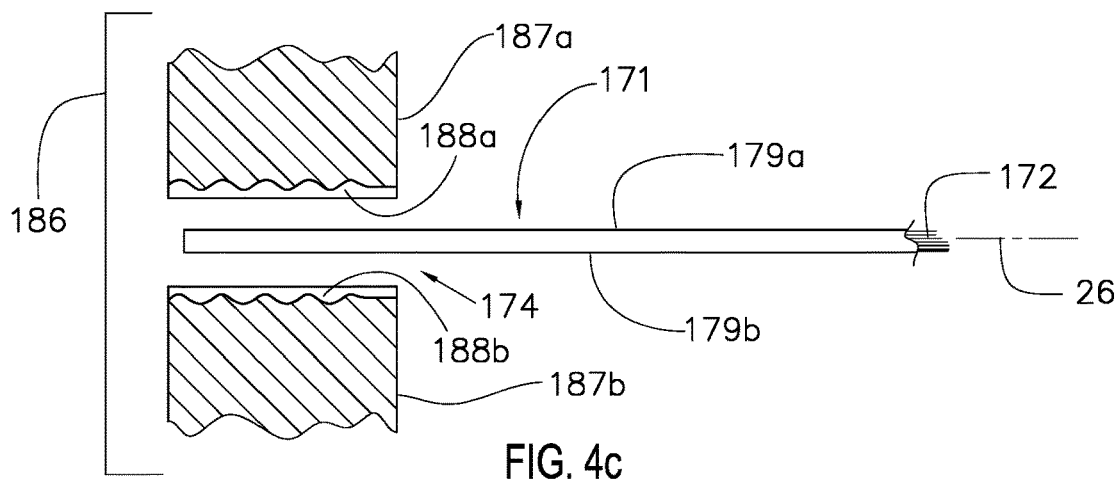
FIG. 4c is a partial cross section view of the spoke of FIG. 4a, including forming dies shown prior to forming of the spoke end.
Figure 4D:
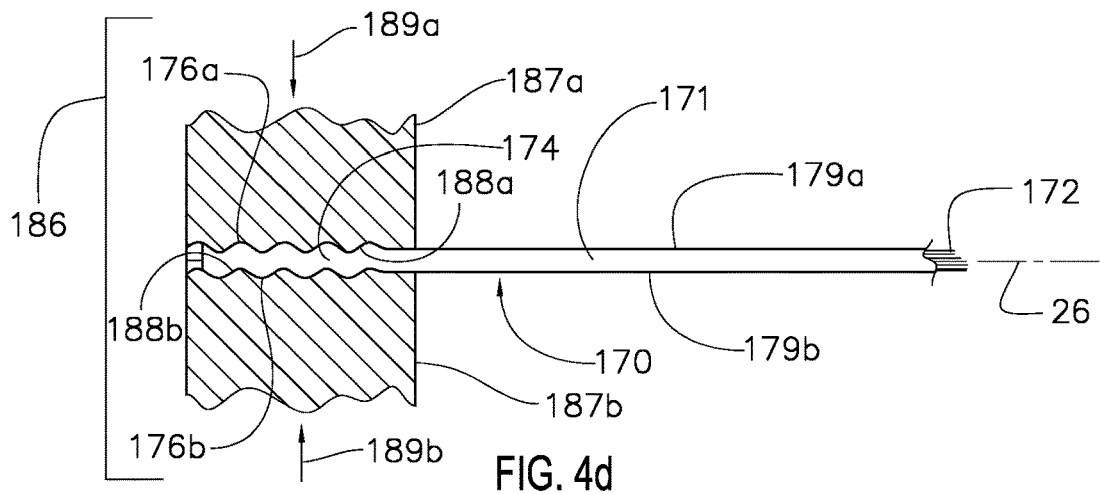
FIG. 4d is a partial cross section view of the spoke of FIG. 4a, including forming dies shown during forming of the spoke end.

FIG. 4c shows a spoke rod 171 prior to being formed to create spoke 170, including a mold die set 186 consisting of upper plate 187a with upper cavity 188a and lower plate 187b with lower cavity 188b. As is conventional in mold configuration, upper cavity 188a and lower cavity 188b have a negative contour corresponding to the positive contour of the subsequently-formed configured surfaces 176a and 176b respectively. Upper cavity 188a and lower cavity 188b are preferably rigid surfaces as is conventional. Prior to molding and forming, the spoke rod 171 is shown as a generally straight longitudinal rod of generally constant cross section along the longitudinal axis 26, with a straight and smooth external surface including end portion 174 and a longitudinal axis 26. The spoke rod 171 is also preferably a generally rigid element that can support its own weight without slumping. The unformed end portion 174 of spoke rod 171 is positioned between upper cavity 188a and lower cavity 188b as shown in FIG. 4c. FIG. 4d shows the upper plate 187a and lower plate 187b as next pressed together in directions 189a and 189b to sandwich and plastically deform the end portion 174 to create the configured surfaces 176a and 176b as shown. Upon subsequent removal from the mold die set 186, the spoke rod 171 has been deformed to include configured surfaces 176a and 176b and is thus transformed to create the spoke 170 as shown in FIGS. 4a-b. It is noted that, due to the bent and corrugated end portion 174, the overall longitudinal length of the spoke 171 may be slightly shorter than the original spoke rod 170.

Spoke rod 171 is preferably made of carbon fiber reinforced polymer resin. Particularly if this resin is a thermoplastic polymer resin, then the end portion 174 may be heated before or during molding/forming to locally achieve a softened state of the resin at end portion 174. The resin now has increased plasticity and is more highly pliable and deformable so that it may be molded and formed to conform to the contours of cavities 188a and 188b to create configured surfaces 176a and 176b. The fibers commonly will not also be softened, but will preferably instead be deflected to follow the contours of the now-deformed end portion 174. Alternatively, the spoke rod 171 may have a thick coating such that the fiber reinforcement is positioned deep within a central core of the spoke rod 171. In such a case, this coating, which may be the same material as the matrix, may be locally deformed without appreciably deflecting the fibers.

The matrix resin (and/or coating resin) is then cooled to its original temperature, preferably while still under the pressure provided by cavities 188a and 188b, to allow the resin to re-solidify to maintain the rigid configured surfaces 176a and 176b. If the resin is a thermoset polymer resin (such as epoxy), then the resin may be allowed to further catalyze to solidify the configured surfaces 176a and 176b, preferably while still under pressure provided by cavities 188a and 188b, to allow the resin to solidify to include rigid configured surfaces 176a and 176b. Alternatively or additionally, the thermoset resin may be locally softened by heating the region to be formed, especially if the spoke rod 171 is heated above the glass transition temperature of the thermoset resin.

For example, where the resin may preferably be a thermoplastic polymer resin, end portion 174 shown in FIG. 4c may be first heated by some external means such as infra-red radiation. Then, when the mold die set 186 is closed, as shown in FIG. 4d, the cooler mold cavities 188a and 188b will quickly form, chill, and solidify the end portion 174 to then include configured surfaces 176a and 176b rigidly formed therein. In an alternative example, the mold cavities 188a and 188b may be heated so that their forming surfaces may transfer heat to end portion such that it may soften upon contact therebetween to simultaneously plastically deform and create configured surfaces 176a and 176b. In a further alternative example, the upper mold cavity 188a may be in an energized ultrasonic horn where mechanical energy may be transferred from the horn to the end portion 174 to simultaneously heat and plastically deform the end portion 174 to create configured surfaces 176a and 176b. End portion 174 is subsequently or simultaneously cooled to its original temperature and re-solidified to include a rigid and stable configured surfaces 176a and 176b. FIGS. 4c-d describe only one representative method of molding and forming a given configured surface in the spoke. A wide range of alternate methods and/or molding configurations known in industry may alternatively be utilized to create this configured surface.

It is understood that the service temperature of the spoke 170 is below the softening temperature of the resin so that the geometry of the configured surfaces 176a and 176b are returned to its original harder and rigid state upon subsequent cooling so that that configured surfaces 176a and 176b are maintained during use. Since mold cavities 188a and 188b impinge and apply pressure to the end portion 174 in a lateral direction, it may be considered that they serve to provide lateral deformation of the spoke 170. FIGS. 4c and 4d describe a representative method of molding and deforming the spoke rod 171 in a specified localized region (i.e. end portion 174) of an otherwise non-deformed spoke rod 171. Due to this lateral deformation, the overall longitudinal length of the spoke rod 171 need not be appreciably altered when the end portion 174 is molded and formed to create spoke 170. This localized region may alternatively be at a location longitudinally inboard of the end portion 174 (as described in FIG. 8c).

It is noted that configured surfaces 176a and 176b are considered to be laterally outwardly facing external configured surfaces since they are formed in the exposed exterior side wall surface of the spoke 170. This is in contrast to a laterally inwardly facing internal configured surface such as a configured surface that would be within an internal cavity of the spoke. An external configured surface may serve to engage a connecting element positioned laterally outwardly of the spoke.

Figure 5A:
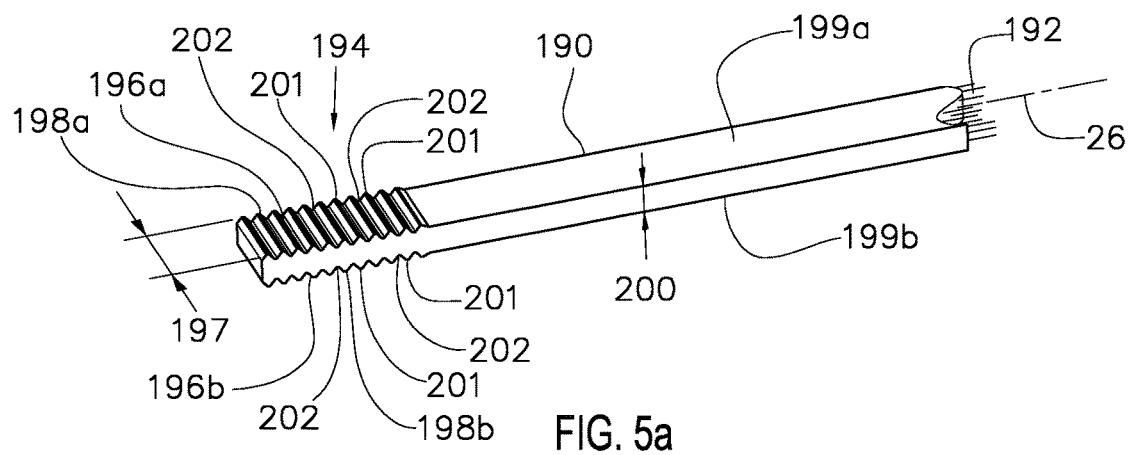
FIG. 5a is a partial perspective view of a fourth embodiment of the present invention, showing a formed and configured spoke end having laterally opposed configured surfaces that include a series of longitudinally spaced ridged engagement surfaces.
Figure 5B:
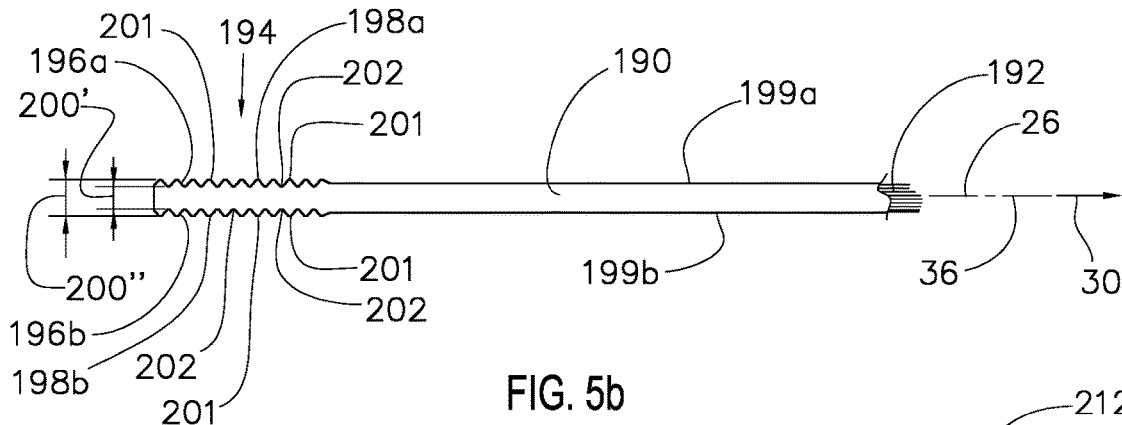

FIGS. 5a-b describe a spoke 190 with reinforcement fibers 192 and with an end portion 194 that has configured surfaces 196a and 196b in the form of a ribbed or ridged configuration. Spoke 190 is shown here to have a generally flat profile with a width 197 along faces 199a and 199b greater than its thickness 200 (between faces 199a and 199b). The end portion 194 is formed in a manner such as that described in FIGS. 4c-d to create configured surfaces 196a and 196b with a ribbed profile consisting of a series of longitudinally spaced ribs or ridges 198a and 198b that extend along the width 197 as shown. Spoke 190 starts as a generally smooth and straight rod of width 197 and thickness 200. End portion 194 is then be locally formed in a method similar to that described in FIGS. 4c-d, or by some other method known in industry, to provide the configured surfaces 196a and 196b as shown here.

In contrast to the generally constant thickness 180 of the wavy configured surface 176 of FIGS. 4a-b, the ribbed profile of FIGS. 5a-b has a variable thickness in the end portion 194, with a greater thickness 200' across the peaks 201 of laterally opposed ridges 198a and 198b and reduced thickness 200" across the laterally opposed valleys 202 between adjacent peaks 201. Thus, configured surfaces 196a and 196b includes a series of respective laterally projecting peaks 201 that are laterally opposed to each other. The configured surfaces 196a and 196b are shown here to be arranged such that the longitudinally spaced peaks 201 of configured surface 196a are generally longitudinally coincident with the longitudinally spaced peaks 201 of configured surface 196b, while longitudinally spaced valleys 202 of configured surface 196a are generally longitudinally coincident with the longitudinally spaced valleys 202 of configured surface 196b. The flanks of ridges 198a and 198b may serve as laterally projecting engagement surfaces to create an overlie engagement for connection with a bracing element (not shown) to support spoke tension forces. Similar to that described in FIGS. 4a-b, the ribbed profile of FIGS. 5a-b results in a series of longitudinally spaced engagement surfaces associated with configured surfaces 196a and 196b. These engagement surfaces extend along the width 197 and perpendicular to the longitudinal axis 26 and to the direction of spoke tension 30 forces. Configured surfaces 196a and 196b may be formed in end portion 194 in a manner similar to that described in FIGS. 4a-d or in any other forming method known in industry, preferably a method that utilizes heat and pressure locally applied to the end portion 194.

Figure 6A:
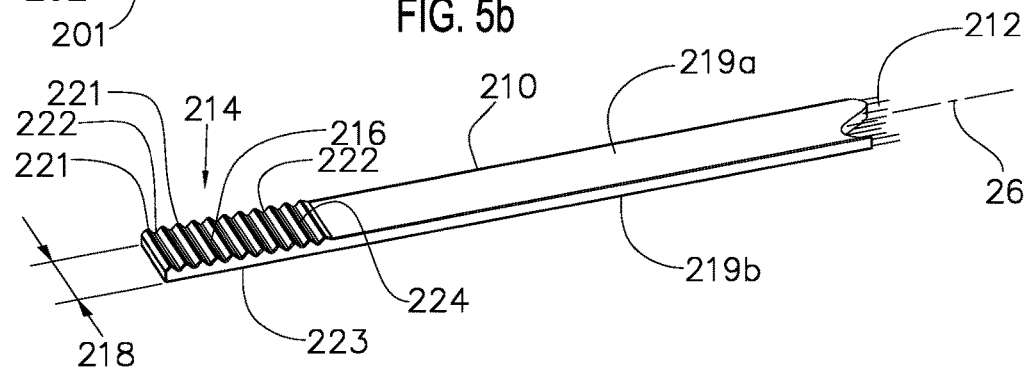
FIG. 6a is a partial perspective view of a fifth embodiment of the present invention, showing a formed and configured spoke end having a one-sided configured surface that include a series of longitudinally spaced ridged engagement surfaces.
Figure 6B:
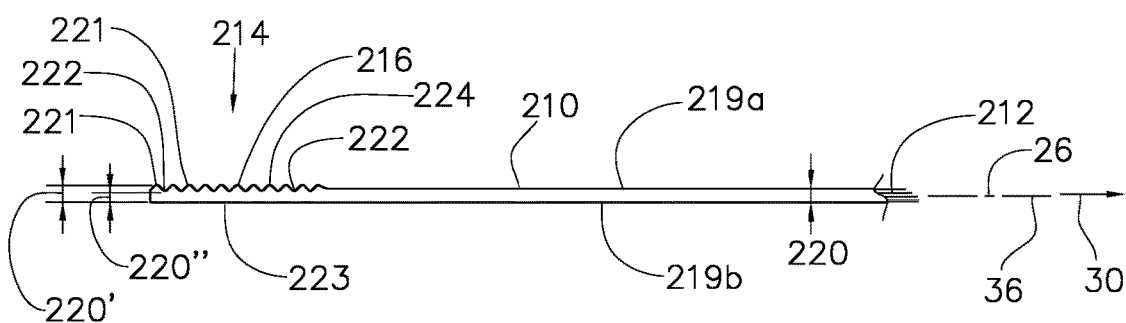

FIGS. 6a-b describe a spoke 210 similar to the spoke 190 of FIGS. 5a-b, however spoke 210 includes only one configured surface 216. Spoke 210 includes reinforcement fibers 212 with an end portion 214 that has a configured surface 216 in the form of a ribbed configuration. Spoke 210 is shown here to have a generally flat profile with a width 218 along faces 219a and 219b greater than its thickness 220 (between faces 219a and 219b). The end portion 214 is formed to create a single configured surface 216 with a ribbed profile consisting of a series of longitudinally spaced ribs or ridges 224 that extend along the width 218 as shown. Spoke 210 starts as a generally smooth and straight rod of width 218 and thickness 220. End portion 214 may then be locally formed in a manner similar to that described in FIGS. 4c-d or by some other method known in industry, to provide the configured surface 216 as shown here.

Since the spoke 210 has only one configured surface 216 formed in face 219a, the surface 223 is generally smooth and non-configured in the region laterally opposed to configured surface 216. The ribbed profile of FIGS. 6a-b has a variable thickness 220 in the end portion 214, with a greater thickness 220' at the peak of the ridge and reduced thickness 220" in the valley between adjacent peaks. Thus, end portion 214 includes a series of laterally projecting peaks 221 longitudinally adjacent a corresponding series of laterally relieved valleys 222. The flanks of ridges 224 may serve as laterally projecting engagement surfaces to create an overlie engagement for connection with a bracing element (not shown) to support spoke tension forces. Similar to that described in FIGS. 4a-b, the ribbed profile of FIGS. 6a-b results in a series of longitudinally spaced engagement surfaces associated with configured surface 216. These engagement surfaces extend along the width 218 and perpendicular to the direction of spoke tension 30 forces. Configured surface 216 may be formed in end portion 214 in a manner similar to that described in FIGS. 4a-d.

Figure 7A:
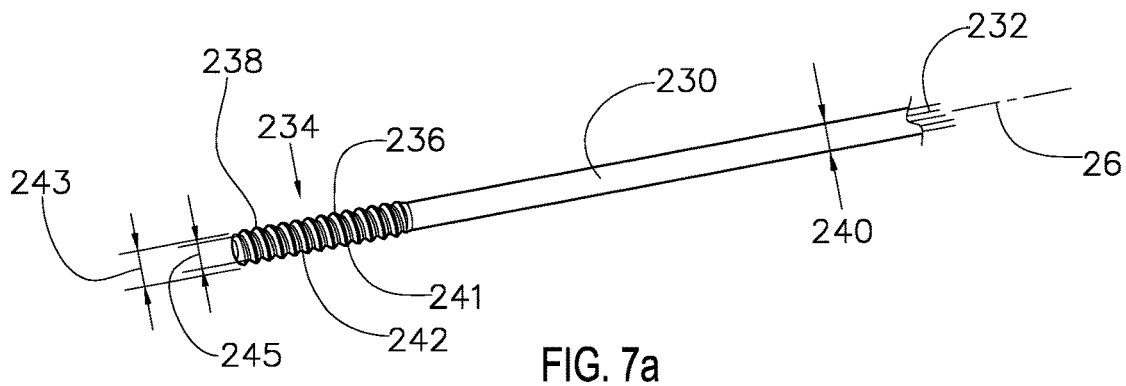
FIG. 7a is a partial perspective view of a sixth embodiment of the present invention, showing a formed and configured spoke end having a helical thread ridge configuration to provide a longitudinal engagement surface.
Figure 7B:
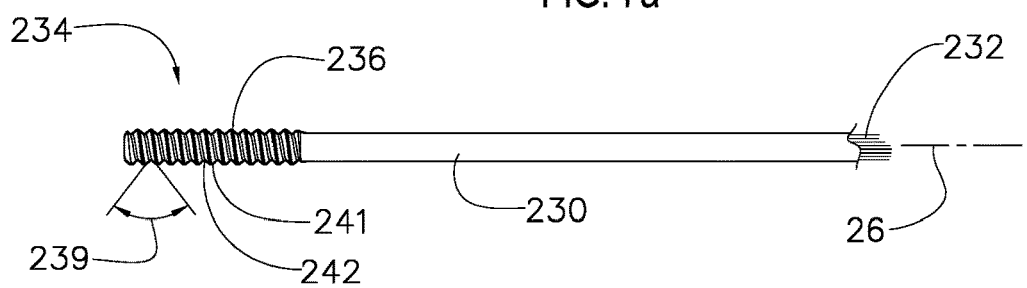

FIGS. 7a-b describe a spoke 230 with reinforcement fibers 232 with an end portion 234 that has a configured surface 236 in the form of a helical ribbed or externally threaded configuration. Spoke 230 is shown here to have a generally circular cylindrical profile with a circular cross section of diameter 240. Spoke 230 starts as a generally smooth and straight rod of diameter 240. End portion 234 may then be locally formed in a manner similar to that described in FIGS. 4c-d or otherwise formed to provide a configured surface 236 shown here as an external thread 238 consisting of a helical ribbed thread profile shown here. This helically ribbed profile consists of a laterally continuous raised helical thread ridge 241 that wraps around the longitudinal axis 26 to create series of longitudinally spaced ribs or ridges that extend to cross the longitudinal axis 26 when viewed in a plan view as shown in FIG. 7b. The helically ribbed profile is shown here as a conventional "vee" profile where the flanks of ridge 241 are tapered with angle 239 between root and crest. While this helical thread ridge 241 is technically a single ridge that wraps around the diameter of end portion 234 to double back on itself, as viewed in the plan view of FIG. 7b, this ridge 241 creates a series of longitudinally spaced ribs to provide a longitudinal engagement surface to be utilized in providing a connection between the spoke 230 and a bracing element.

The helical ribbed profile of FIGS. 7a-b has a variable thickness in the end portion 234, with a major diameter 243 at the laterally outward peak (corresponding to the major diameter of the thread) of the thread ridge 241 and minor diameter 245 at the root 242 (corresponding to the minor diameter of the thread) between longitudinally adjacent peaks. Similar to that described in FIGS. 4a-b, when viewed as shown in FIG. 7b, the helical ribbed profile of FIGS. 7a-b results in a series of longitudinally spaced engagement surfaces (corresponding to the laterally projecting flank of the thread ridge 241) associated with configured surface 236. These engagement surfaces extend to cross the longitudinal axis 26 to provide a mechanical overlie engagement to support spoke tension 30 forces. The thread ridge 241 may provide an overlie engagement with a mating internal thread of a connecting element (not shown) in a threadable engagement to support and resist spoke tension 30 loads. An example of such an engagement is shown in FIGS. 14a-e and 15a-e. While the helical thread ridge 241 is shown here to be a continuous helical ridge, it is envisioned that the helical thread ridge 241 may alternatively be a discontinuous or otherwise interrupted helical ridge.

Figure 8A:
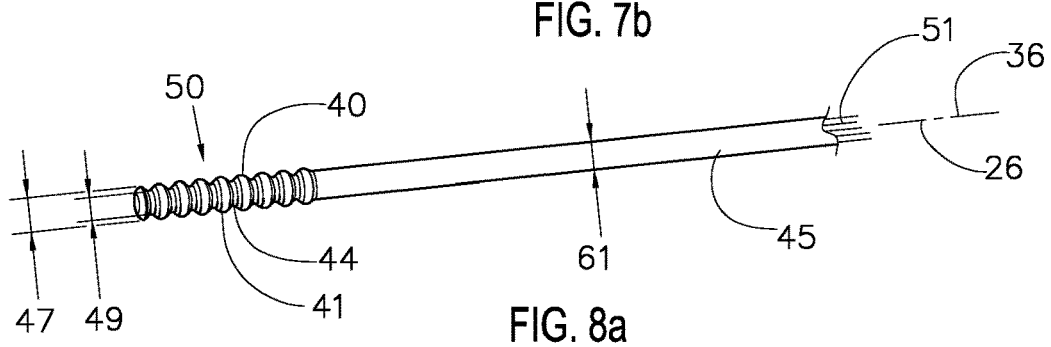
FIG. 8a is a partial perspective view of a seventh embodiment of the present invention, showing a formed and configured spoke end having a ribbed configuration that include a series of longitudinally spaced engagement surfaces that circumscribe the longitudinal axis.
Figure 8B:
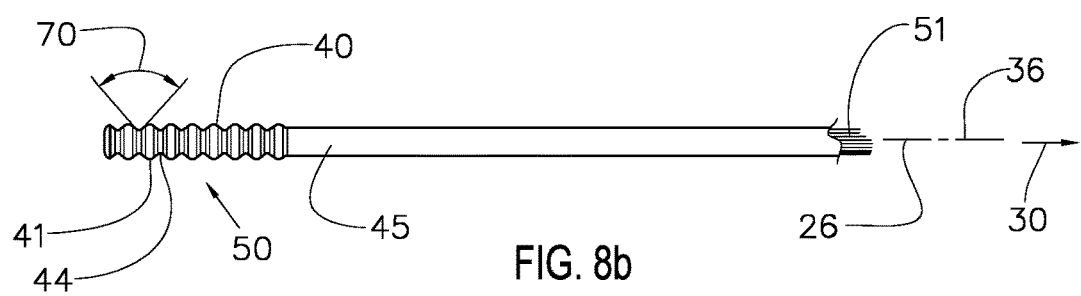

As shown in FIGS. 8a-b, spoke 45 includes an end portion 50 with a configured surface in the form of ribbed or knurled surface 40, which includes a series of laterally raised ribs 41 that are longitudinally spaced along the longitudinal axis 26 to create correspondingly laterally relieved portions 44 therebetween along the longitudinal axis 26. The transition between ribs 41 and relieved portions 44 results in a series of longitudinally spaced laterally outwardly projecting engagement surfaces (i.e. flanks) therebetween. The flanks are shown here to be tapered with angle 70 between root and crest. These lateral projecting surfaces may be utilized to provide interlocking and overlying engagement with a bracing element as a means of connection therebetween to support and resist spoke tension 30 forces. Examples of such an arrangement are described variously herein. Spoke 45 starts as a generally smooth and straight rod with a circular cross section of diameter 61. End portion 50 may then be locally formed in a manner similar to that described in FIGS. 4c-d or by some other means known in industry to provide the knurled surface 40 as shown here. Spoke 45 is shown here to be generally round in cross-section and ribs 41 are circular ribs that create a major diameter 47 of knurled portion, with relieved portions 44 resulting in a minor diameter 49 of knurled portion. Spoke 45 is shown to be a fiber-reinforced spoke 45, with high strength fibers 51 in a resin matrix as described hereinabove.

Figure 8C:
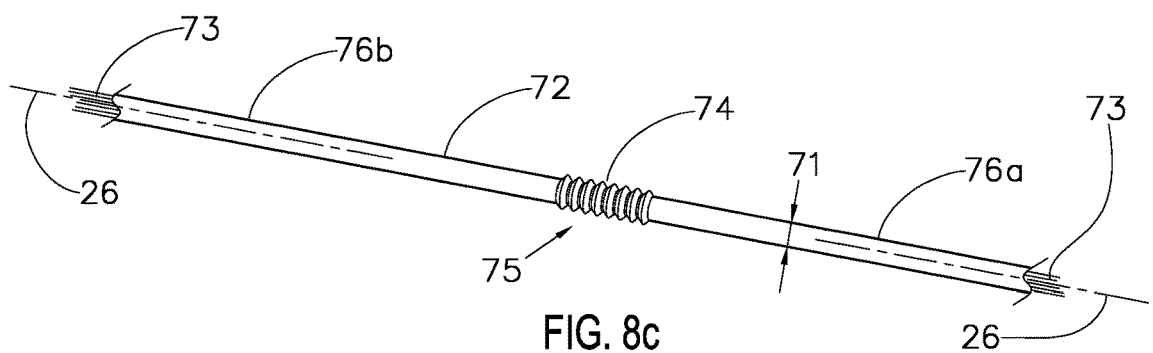
FIG. 8c is a partial perspective view of an eighth embodiment of the present invention, showing a duplex spoke with a formed and configured region at a midpoint between two spoke spans. The configured region has a ribbed configuration that includes a series of longitudinally spaced engagement surfaces that circumscribe the longitudinal axis.

While FIGS. 8a-b describe a spoke 45 with a knurled surface 40 adjacent its end portion, the knurled surface 40 may alternatively be located in a middle region or mid portion 75 of the spoke, as shown in FIG. 8c. FIG. 8c describes a spoke 72 that includes a knurled or configured portion 74 located at a midpoint along the spoke 72, as opposed to the end portion 50 of spoke 45 as described in FIGS. 8a-b. Spoke 45 starts as a generally smooth and straight rod of diameter 71. Mid portion 75 may then be locally formed in a manner similar to that described in FIGS. 4a-d or otherwise formed to provide the configured portion 74 as shown here. In bicycle wheel applications, it may be preferable that mid portion 75 be located at least 100 millimeters from the end portion of the spoke 72.

Spoke 72 is shown to be a fiber-reinforced spoke 72, with high strength fibers 73 in a resin matrix, as described hereinabove. The configured surface 74 is shown here to be identical to knurled surface 40 of FIGS. 8a-b. By locating the configured surface 74 at a midpoint along the length of the spoke 72, a duplex spoke 72 may be created, which incorporates two structural spans 76a and 76b, with each span extending between two bracing elements. For example, the configured portion 74 may be engaged to the hub flange (not shown), with a first span 76a extending to anchor at one point of the outer rim (not shown) and a second span 76b extending to anchor at another point of the outer rim. FIG. 8c provides one example of a duplex spoke arrangement, which may alternatively take on a variety of forms, including alternate contours substituted for the configured portion 74 as well as alternate spoke profiles.

FIGS. 9a-d describe an embodiment where an enlarged portion or head 140 is formed directly onto the second end 126 of a spoke rod 121 to create a spoke 122. It is preferable that the spoke rod 121 of this embodiment be of the type with continuous fibers 141 encapsulated in a thermoplastic polymer resin matrix. Spoke rod 121 shown here starts as a generally smooth and straight rod having a constant circular cross section of diameter 123 along its longitudinal axis 26. Spoke rod 121 may alternatively have a non-circular cross section profile. As is preferred, spoke rod 121 is shown here to be a generally rigid rod that may extend within cavity 145 without slumping or leaning. End portion 126 is then locally formed as shown or otherwise formed to provide the enlarged portion 140 of spoke 122 as shown here.

Figure 9A:
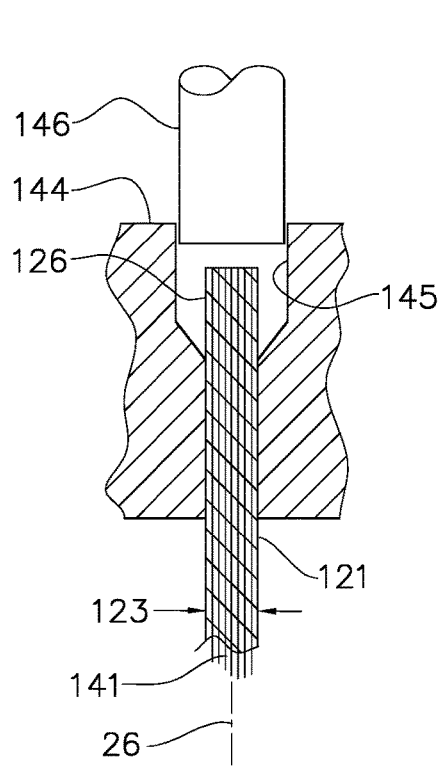
FIGS. 9a-c are partial cross-sectional views, taken along the tensile axis, of a ninth embodiment of the present invention, and showing a sequence of operations involved in forming an enlarged head onto the end of a spoke, including a mold or spoke forming die.
Figure 9B:
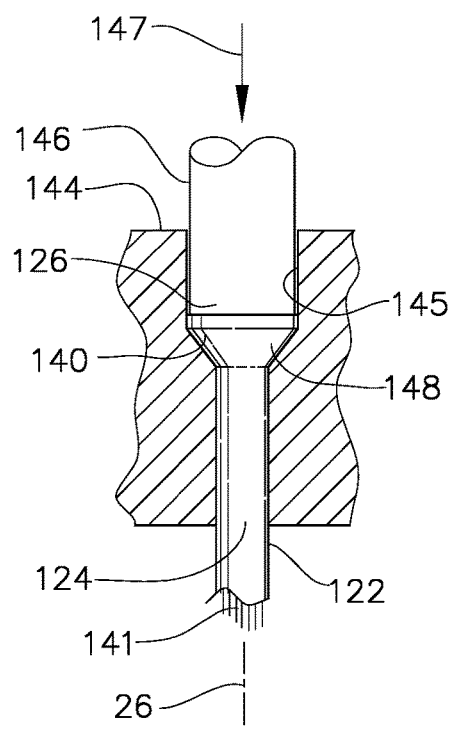

FIGS. 9a-b show how such a spoke 122 may be created to include an enlarged portion 140. Prior to being formed, spoke rod 121 is clamped in a mold 144 with the end portion 126 extending into the mold cavity 145 of mold 144 as shown in FIG. 9a. The end portion 126 of spoke rod 121 is locally heated from its original state to a softened state of reduced hardness and increased plasticity. While end portion is in this softened state, ram 146 is displaced and pressed in direction 147 to plastically deform the end portion 126 to conform to the mold cavity 145 as shown in FIG. 9b and to form an enlarged portion 140 directly onto the end portion 126. Mold 144 and ram 146 may be considered as two portions of a forming die set to deform the end portion 126. Note that this is merely a representative method of forming such an enlarged portion 140 in a predetermined localized region of a spoke rod 121. Since ram 146 presses to deform the spoke 122 in a longitudinal direction, it may be considered that ram 146 serves to provide longitudinal deformation of the spoke 122. Alternatively, a wide range of alternate forming techniques may be utilized that are known in industry. For example, ram 146 may be replaced by an ultrasonic horn, where ultrasonic energy is used to heat, soften, and plastically deform the second end 5 of spoke 2. Due to this longitudinal deformation, the overall longitudinal length of the spoke rod 121 is likely shortened somewhat when the end portion 126 is molded and formed to create enlarged portion 140.

Figure 9C:
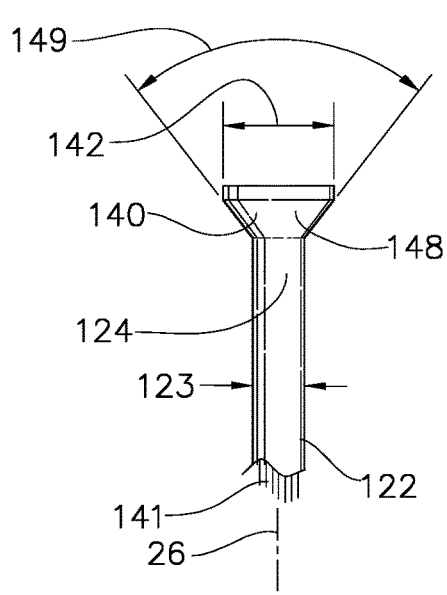

After deformation, the spoke 122 is cooled to its original state and removed from the mold 144. The result is that an enlarged portion 140 is now rigidly formed on the second end 126 of spoke 122 to include a flared shoulder 148 as illustrated in FIG. 9c. The flared shoulder 148 may be considered as a configured surface and as a laterally outwardly projecting engagement surface of the spoke 122. The un-deformed portion of the spoke 122 is now considered to be a shank portion 124. It should be noted that the fibers 141 of spoke 122 may preferably extend within the enlarged portion 140 to create uninterrupted structural connection between the spoke 122 and enlarged portion 140. The enlarged portion 140 has a larger diameter 142 than the diameter 123 of shank portion 124, thus enlarged portion 140 may be considered to be a region of variable cross section geometry along the longitudinal axis 26. The laterally projecting flared shoulder 148 is shown here to be tapered at angle 149 to create a tapered engagement surface that circumferentially circumscribes the shank portion 124. It is noted that the tapered shoulder 148 may be preferable to a square shoulder because this corresponds to a less-sharp and more gentle bend to the fibers 141 as they extend between the shank portion 124 and the enlarged portion 140. Reducing the sharpness of the this bend tends to increase the increase the strength and tensile properties of the fibers 141 in this bent region.

Figure 9D:
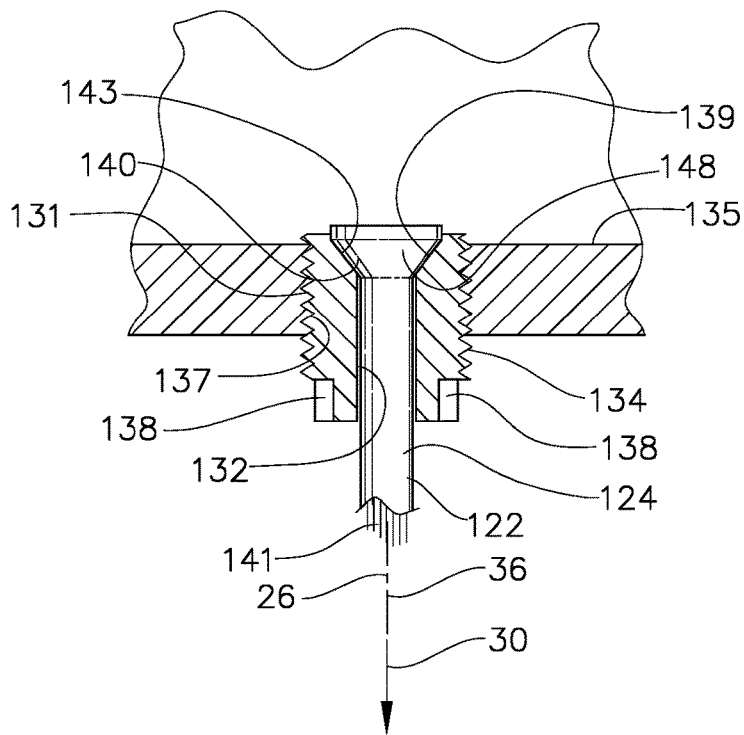
FIG. 9d is a partial cross-sectional view, taken along the tensile axis, and showing the spoke of FIG. 9c as connected to a bracing element by means of a threaded collar.

FIG. 9d shows an exemplary representation of how the spoke 122 may be connected to a bracing element. Threaded collar 134 may be utilized as an intermediate connecting element to connect the spoke 122 to a spoke bed 135 of a bracing element (i.e. hub flange or rim). Threaded collar 134 includes external threads 131, hole 132 to receive the shank portion 124, tapered step 139 to engage with flared shoulder 148, and flats 138 for manual manipulation with a wrench (not shown). Shank portion 124 extends through hole 132 and the flared shoulder 148 of the enlarged portion 140 is matched to step 139 of the threaded collar 134 to create a laterally overlying engagement interface 143 to support and resist spoke tension 30 forces. Spoke bed 135 includes a threaded hole 137 therethrough, with the external threads 131 of threaded collar 134 threadably engaged thereto. By utilizing a wrench (not shown) on flats 138, the threaded collar 134 may be rotated about the tensile axis 36 to adjust the threaded engagement between the threads 131 and the threaded hole 137 to adjust the pre-tension of the spoke 122 in a manner similar to that described in FIGS. 2a-c. In contrast to the spokes described in FIGS. 4a-d, 5a-b, 6a-b, 7a-b, and 8a-b, which all show a multiplicity of longitudinally spaced engagement surfaces, flared shoulder is shown here to provide a singular engagement surface. The engagement interface 143 is shown here as a tapered interface such that spoke tension 30 will tend to wedge the flared shoulder 148 against the step 139.

Figure 10A:
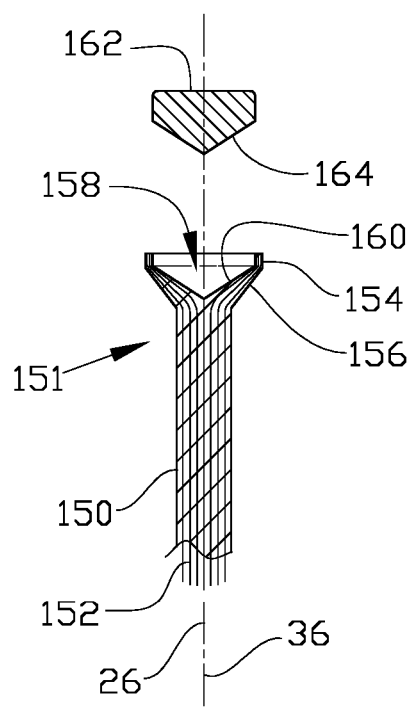
FIG. 10a is a partial cross-sectional view, taken along the tensile axis, of a tenth embodiment of the present invention, and showing a flared head at the end of the spoke with a plug shown prior to its assembly with the flared end.
Figure 10B:
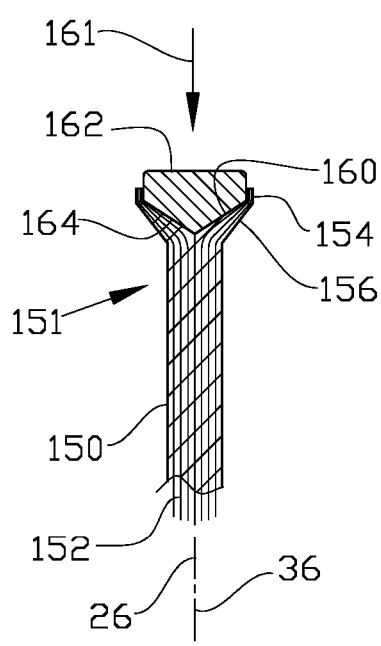
FIG. 10b is a partial cross-sectional view, taken along the tensile axis, of the embodiment of FIG. 10a, and showing the plug assembled to the flared end.
Figure 10C:
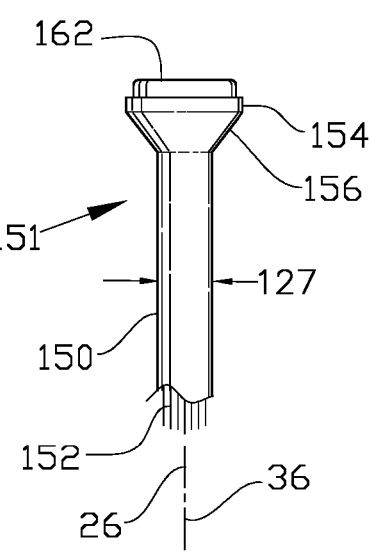
FIG. 10c is a partial orthogonal view, taken along the tensile axis, of the embodiment of FIG. 10a, and showing the plug assembled to the flared end.

FIGS. 10a-c describe an embodiment similar to that of FIGS. 9a-d, with an enlarged head 154 formed directly onto the end portion 151 of the spoke 150. It is preferable that the spoke 150 of this embodiment be of the type with continuous fibers 152 encapsulated in a thermoplastic polymer resin matrix. As shown in FIG. 10a, the head 154 may be formed in the end portion 151 in a manner similar to that described in FIGS. 9a-b to include a flared shoulder 156 and a recess 158 with tapered sides 160. Spoke 150 also includes a recess 158 with a tapered surface in its end portion 150. Plug 162 includes tapered surface 164 that is matched to tapered sides 164 of recess 158.

Spoke 150 had started as a generally smooth and straight rod of diameter 127. Enlarged head 154 was then locally formed, using a variety of possible processes described herein and/or otherwise known in industry, to provide the flared shoulder 156 (i.e. configured surface) as shown here. The flared shoulder 156 may be considered as a laterally outwardly projecting engagement surface of the spoke 150. In contrast to the solid enlarged portion 140 of embodiment of FIGS. 9a-d, where the enlarged portion 140 has a larger cross-sectional area than the remainder of the spoke 122, the head 154, with recess 158, preferably spreads the fibers 152 as shown to maintain a generally constant cross-sectional area along the longitudinal axis 26. It should be noted that the fibers 152 of spoke 150 are shown here to preferably extend within the head 154 to create an uninterrupted structural connection between the spoke 150 and the head 154. As shown in FIG. 10a, a plug 162, with tapered surface 164 is positioned to be assembled to the recess 158 of spoke 150.

As shown in FIGS. 10b-c, the plug 162 is assembled to the recess 158 in direction 161 such that tapered surface 164 is nested with the tapered sides 160 of recess 158. The plug 162 may be joined to the recess 158 by means of a variety of methods, including bonding, welding, mechanical fastening, etc. A solid enlarged head is thus created in the end portion 151 to create a headed spoke similar to that described in FIGS. 9a-d. The plug 162 serves to fill the recess 158 and to create a lateral bridge across tapered sides 160 to prevent the flared shoulder 156 from collapsing when the spoke 150 is subject to spoke tension 30 forces, such as described in FIG. 9d.

Figure 11A:
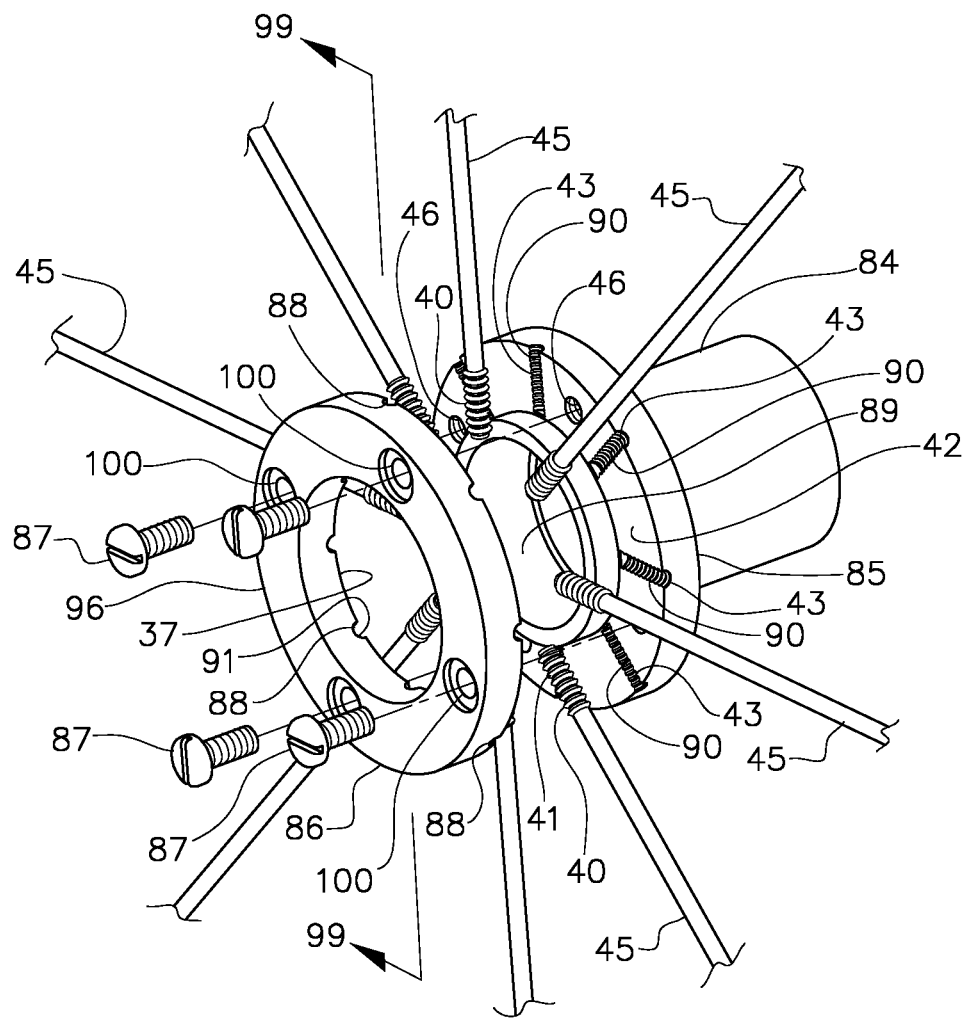
FIG. 11a is a partial perspective exploded view of an eleventh embodiment of the present invention, including a two-piece hub flange to laterally sandwich and clamp the spokes, including pre-formed internal ribs of the hub flange and pre-formed external ribs of the spoke.
Figure 11B:
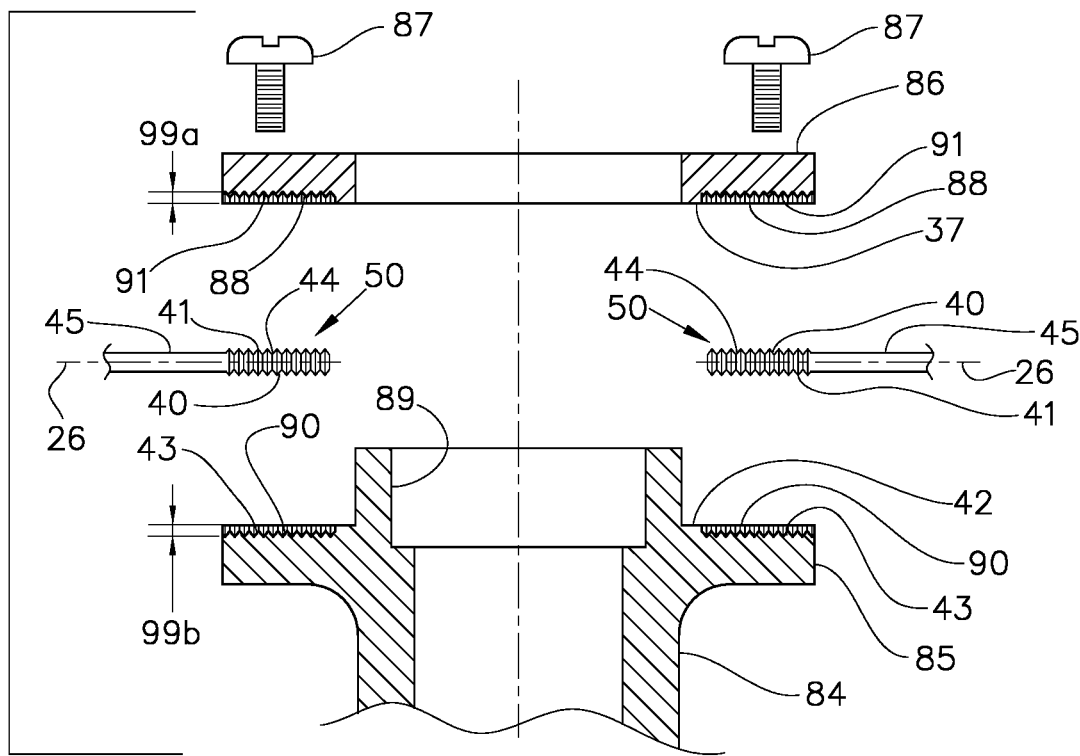
FIG. 11b is a partial cross section exploded view, taken along 99-99, of the embodiment of FIG. 11a, showing the two-pieces of the hub flange as laterally spread apart prior to engagement with the spokes.

FIGS. 11a-d describe an embodiment that includes a clamping member 86 to sandwich and clamp the spoke 45 between the hub flange 85 and the clamping member 86. As shown in FIGS. 11a-b, hub shell 84 includes a hub flange 85 and a bearing bore 89 to facilitate mounting of a bearing (not shown) and axle (not shown). Hub flange 85 serves as both a bracing element and a connecting element and includes internally threaded holes 46 and configured cavities 43 with associated knurled surfaces 90 in its face 42 for engagement with configured or knurled surfaces 40 of spokes 45. Spokes 45 are identical to those described in FIGS. 8a-b. Clamping member 86 includes clearance holes 100 to receive screws 87 and configured cavities 88 with associated knurled surfaces 91 in its corresponding face 37 that are aligned to be opposed to cavities 43 of the hub flange 85. Cavities 43 and 88 have configured surfaces (i.e. knurled surfaces 90 and 91 respectively) to provide a recessed contour that is matched to the knurled surface 40 of the spoke 2. Knurled surfaces 90 and 91 are shown here as a series of longitudinally spaced internal ribs that extend laterally inwardly and are arranged to mate and engage with the corresponding ribs 41 and relieved portions 44 of spoke 45. Screws 87 are shown here as representative fasteners that may be utilized to assemble the clamping member 86 to the hub shell 84 to sandwich the spokes 45.

Figure 11C:
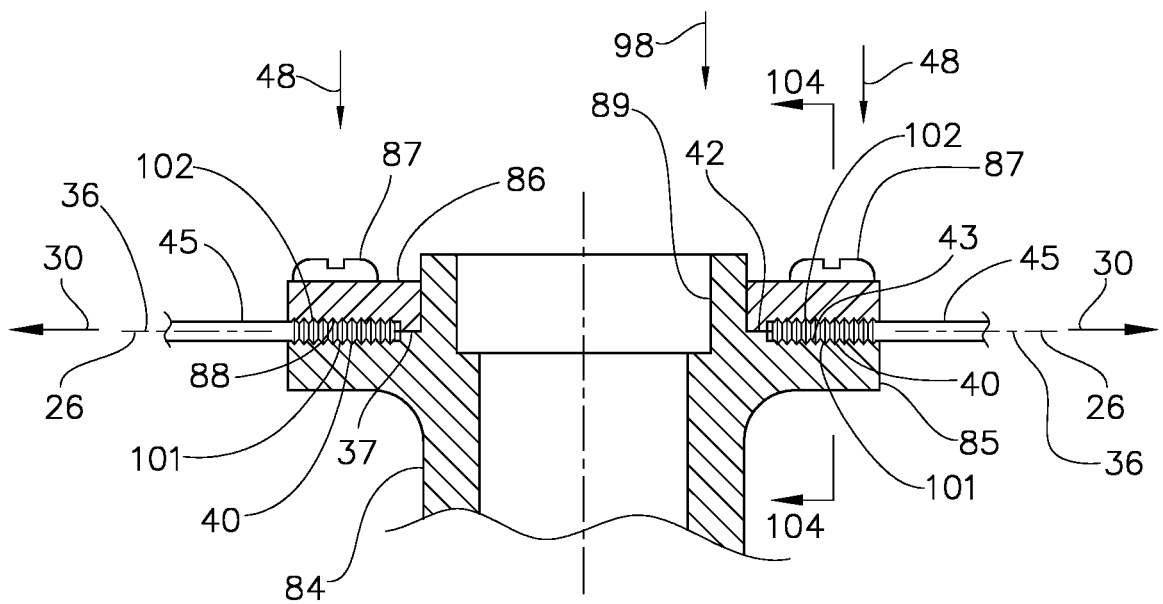
FIG. 11c is a partial cross section view, taken along 99-99, of the embodiment of FIG. 11a, showing the two-piece hub flange as laterally assembled and closed to sandwich and engage with the spokes, with the internal ribs nested and engaged to the external ribs in a longitudinal engagement.

Knurled surfaces 90, 91, and 40 had been pre-formed prior to this assembly. Upon assembly as shown in FIGS. 11b-c, spokes 90 are first positioned such that knurled surfaces 40 are nested in their corresponding cavities 43, with the knurled surfaces 40 nested with corresponding knurled surfaces 90. Clamping member 86 is then assembled to the hub shell 84 in direction 98, as shown in FIG. 3c, to axially sandwich the knurled portions 40 of spokes 2, with the knurled surfaces 40 now also nested with corresponding knurled surfaces 91. Screws 87 are passed through clearance holes 100 and threadably engaged with mating threaded holes 46 of the hub flange 84. When the screws 87 are threadably tightened into holes 46, with the underside of the screw heads pressed against the clamping member 86, the clamping member 86 is driven axially toward the hub flange 85, in direction 98, to provide clamping force 48 to sandwich and clamp the knurled portions 40 of spokes 45. The knurled surfaces 40 are thus nested and pressed between cavities 88 and 43 such that the external ribs of knurled surface 40 are laterally overlapping, overlying, and thus are longitudinally engaged, to the internal ribs of knurled surface 90 at engagement interface 101 and to the internal ribs of knurled surface 91 at engagement interface 102. With knurled surfaces 40 intimately engaged and interlocked with knurled surfaces 90 and 91, a firm longitudinal engagement connection between the hub shell 84 and the spoke 45 is thus achieved. The spokes 45 are now structurally anchored to the hub flange 85 and are capable of resisting spoke tension 30 forces. The clamping member 86 is firmly engaged and retained to the hub flange 84 by the screws 87, which also serve to maintain their clamped connection with the spokes 45. Since the clamping member 86 and hub flange 85 both have a longitudinal engagement at engagement interfaces 101 and 102 (with the spoke 45) to restrain spoke tension 30 loads, both clamping member 86 and hub flange 85 are also considered to be connectors or connecting elements. It is noted that clamping member 86 and hub flange 85 are two components of a single connecting element assembly and that are laterally displaced toward each other to create engagement interfaces 101 and 102 that serve to anchor a multiplicity of spokes 45. Screws 87 serve to laterally retain and lock clamping member 86 and hub flange 85 to maintain engagement interfaces 101 and 102.

In this embodiment, a wide range of materials may be utilized to form the hub flange 85, clamping member 86, and spoke 45. The spoke is preferably made of fiber reinforced polymeric composite material or a metallic material, such as aluminum, titanium, or steel. The hub flange 85 and clamping member 86 may be made of a wide range of materials that are preferably light weight and high in strength and stiffness, such as aluminum, magnesium, and/or fiber reinforced polymer. For example, the hub flange 85 and/or clamping member 86 may be made of polyamide resin reinforced with glass or carbon fibers that are known to possess high structural strength and may be easily and economically molded in conventional processes.

Note that the lateral depth 99*a* of cavity 88 and the lateral depth 99*b* of cavity 43 may be controlled such that, upon tightening of the screws 87, faces 42 and 37 contact each other, thereby providing a hard depth-stop to limit the lateral depth of overlie engagement between the knurled surface 40 and knurled surfaces 90 and 91 at engagement interfaces 101 and 102. The spoke 45 is longitudinally retained to the hub flange 85 by the laterally projecting overlie engagements at the engagement interfaces 101 and 102 between the knurled surface 40 and respective knurled surfaces 90 and 91 to resist spoke tension 30 forces.

In the arrangement shown in FIG. 11*d*, faces 37 and 42 axially abut each other such that knurled surfaces 90 and 91 may have a loose fit or only lightly contact knurled surface 40 in a positional engagement. Since faces 37 and 42 bottom out against each other in what is termed a "hard stop", this abutting interface provides the axial depth stop for the lateral overlie engagement between knurled surface 40 and knurled surfaces 90 and 91 to limit any lateral preload from clamping force 48.

Alternatively, as shown in FIG. 11*e*, the axial depths 99*a* and 99*b* may be designed to be somewhat shallower than that shown in FIG. 11*d*, such that the axially abutting knurled surfaces 40, 90, and 91 abut and stack against each other to limit the travel of the clamping member 86 in direction 98, leaving a small axial and lateral gap 103 between faces 37 and 42 as shown in FIG. 11*e*. In other words, the knurled surface 40 provides a lateral depth stop between knurled surfaces 90 and 91. As such, further tightening of the screws 87 (beyond initial contact between the knurled surface 40 and the cavities 88 and 43) will continue to provide further lateral clamping force 48 to further press and laterally preload the knurled surface 40 into intimate contact with knurled surfaces 90 and 91 at engagement interfaces 101 and 102. Further, since ribs 41 taper laterally outwardly as shown, and the knurled surfaces 90 and 91 are matched to the ribs 41, this lateral clamping and preload results in a lateral wedging between knurled surface 40 and knurled surfaces 90 and 91, to force these contours to be more closely matched such that spoke tension 30 load is more evenly distributed among the individual engagements of the longitudinal engagement therebetween. This serves to fortify and further increase the ability of the engagement interfaces 101 and 102 to restrain spoke tension 30 forces.

Whether the faces 37 and 42 bottom out against each other as shown in FIGS. 11*a-d* or the axial preload (with gap 103) of FIG. 11*e* is utilized, it may be preferable to maintain a lateral preload at engagement interfaces 101 and 102. This lateral preload is defined herein as a residual laterally inward clamping force to squeeze, clamp, or otherwise maintain lateral contact pressure between the spoke (i.e. knurled surface 40) and the connecting element (i.e. cavities 88 and 43) at the engagement interfaces 101 and 102. In addition to the retained overlie engagement at the engagement interfaces 101 and 102, this clamping force serves to force the knurled surfaces 90 and 91 to laterally press and squeeze knurled surface 40 to laterally distort these knurled surfaces very slightly to become more solidly nested and more closely matched to each other to maximize the overlie engagement between these surfaces and to further resist spoke tension 30 forces. This also serves to add a significant normal force (i.e. lateral force) at the engagement interfaces 101 and 102, which results in a high degree of friction therebetween to still further resist spoke tension 30 forces. In FIGS. 11*a-d*, the lateral dimensions of knurled surface 40 and depths 99*a* and 99*b* must be very closely controlled to maintain this laterally inward clamping force. Since FIG. 11*e* includes gap 103, the axial travel between cavities 88 and 43 is not self-limited, and the tolerances of these lateral dimensions need not be quite so precise to maintain this laterally inward clamping force. As such, the gap 103 of FIG. 11*e* may be preferable over the hard stop of FIGS. 11*a-d*.

The cavities 88 and 43 help to provide a well-defined location for alignment of the spoke 45 during its assembly with the clamping member 86 and hub flange 85. Further, these cavities 88 and 43 provide a surface that partially circumferentially wraps around the surface of the spoke to provide more closely matched engagement interfaces 101 and 102 with the knurled surface 40. This may be a preferable arrangement to aid in this assembly. Screws 87, utilized to create the clamping force, are able to be disassembled and re-assembled from the hub flange 85. As such, the entire clamped assembly may be may be easily disassembled and re-assembled, allowing the wheel to be serviced or the spoke(s) 45 to be replaced. Disassembly is performed by reversing the assembly process described above.

It should also be noted that, while screws 87 are shown here to provide the requisite connecting means to sandwich the spoke 45 between the hub flange 85 and the clamping member 86, this is merely a representative connecting means and alternate connecting means are envisioned. For example, the assembly may be designed such that the hub flange 85 and clamping member 86 are first pressed by an external force and then retained in that pressed position by an alternate retaining means, such as a retaining clip or a retaining sleeve. Still further, a wide range of other alternate connecting and/or clamping means may alternatively be utilized.

The embodiment of FIG. 12 is similar to the embodiments of FIGS. 11*a-e*. However, while the spoke 45 of FIGS. 11*a-c* has two axially opposed engagement interfaces 101 and 102, the spoke 52 of FIG. 12 utilizes only a single engagement interface 53. Also, while FIGS. 11*a-e* show a multiplicity of spokes 45 connected to the hub flange 85 by means of a single clamping member 86, the embodiment of FIG. 12 shows each individual spoke 52 as being clamped and/or retained to the hub flange 69 by a corresponding individual screw 62.

Spoke 52 is of generally flat cross section, with a first end 59 having a smooth edge portion 55 laterally opposed to a configured edge portion 54 comprised of a series of directionally raked sawtooth profile ribs 57 pre-formed therein. Screw 62 includes threaded shank 60, clamp surface 65 and head 64. Hub shell 68 includes flange 69, with a series of slots or open cavities 56, each having a pre-formed configured surface 66 in the form of raked sawtooth ribs configured to provide a matched engagement with configured edge portion 54. Hub flange 69 also includes a series of internally threaded holes 58 adjacent their respective cavities 56 to threadably mate with the threaded shanks 60 of screws 62.

During assembly, spoke 52 is first positioned in cavity 56 such that the configured edge portion 54 is contacting the configured surface 66 such that ribs 57 are nested and matched with the mating ribs of the configured surface 66. Screw 62 is then threadably engaged with threaded hole 58 and tightened such that the clamping surface 65 (i.e. underside of the head 64) bears laterally against the smooth edge 55 of spoke 2. As the screw 62 is further threadably tightened, clamping surface 65 presses the configured edge portion 54 into intimate engagement with the configured surface 66, thus creating an interlocking longitudinal engagement therebetween at the engagement interface 53 between the ribs 57 and the configured surface 66. This longitudinal engagement is laterally retained by the screw 62, which preferably also provides a lateral preload and clamping force in direction 67 to actively press the ribs 57 into intimate nested engagement against the ribs of configured surface 66. The spoke 52 is now firmly anchored to the hub flange 69 and is capable of resisting spoke tension 30 forces. The sawtooth rib 57 profile of the configured portion 54 is a preferable profile because this profile provides good blocking engagement with the mating ribs of the configured surface 66 to resist spoke tension 30 force, while maintaining good strength in the mating ribs. It is noted that hub flange 69 is a single connecting element that serves to anchor a multiplicity of spokes 52. Screws 62 serve to laterally retain and lock spokes 52 to the hub flange 69 to maintain engagement interface 53.

The embodiment of FIGS. 13a-d is similar in many respects to the embodiment of FIGS. 11a-e in that that two laterally opposed connecting elements are utilized to laterally sandwich the spoke and provide two corresponding longitudinal engagements with the spoke. While the embodiment of FIGS. 11a-e uses the screws 87 as a means to retain the clamping member 130 to the hub flange 85, the embodiment of FIGS. 13a-d uses a retaining sleeve 252 to hold the gripping collars 254a and 254b in their longitudinally engaged and gripped position with the spoke 45. Further, while the embodiment of FIGS. 11a-c provides attachment of a multiplicity of spokes within a single clamped connection between two elements (the clamping member 86 and the hub flange 85), the embodiment of FIGS. 13a-d provides a connection and engagement interface with only a single mating spoke 45.

FIG. 13a shows the components in exploded view prior to assembly. Sleeve 252 is a generally cylindrical element with an internal cavity 256. Gripping collar 254a includes an external surface 257a and a generally semi-circular cavity 258a that is lined with configured surface 260a comprised of a series of longitudinally spaced ribs as shown and as described hereinabove. Similarly, gripping collar 254b also includes an external surface 257b and a cavity 258b that is lined with configured surface 260b comprised of a series of longitudinally spaced ribs as described hereinabove. These ribs are comprised of a series of laterally raised and relieved surfaces that are longitudinally spaced and that are pre-formed therein. Cavities 258a and 258b are similar to cavities 43 and 88 of FIGS. 11a-e. Configured surfaces 260a and 260b provide a matched contour to knurled surface 40. Gripping collars 254a and 254b also include respective engagement surfaces 259a and 259b. The bracing element 266 represents a portion of the rim or hub flange (not shown) and includes a hole 268 therein to receive the spoke 45. Spoke 45 is identical to that described in FIGS. 8a-b.

FIG. 13b describes the first step in the assembly process. Collars 254a and 254b are assembled in their respective directions 262a and 262b to sandwich the spoke 45 as shown. This causes the configured surfaces 260a and 260b of their respective cavities 258a and 258b to nest, interlock, and sandwich the ribs 41 of the knurled surface 40 of the spoke 45. Next, as shown in FIG. 13c, sleeve 252 is assembled in direction 264, with internal cavity 256 closely fitted to longitudinally overlap the external surfaces 257a and 257b. With sleeve 252 now in place surrounding and enclosing the collars 254a and 254b, as shown in FIGS. 13c-d, the internal cavity 256 laterally restrains the gripping collars 254a and 254b, holding them in their laterally engaged position to provide and maintain a longitudinal engagement interfaces 263a and 263b between the knurled surface 40 and the configured surfaces 260a and 260b. The gripping collars 254a and 254b are thus engaged and connected to the spoke 45 to support spoke tension 30 forces. Thus, the sleeve 252 may be viewed as a retaining element to maintain the longitudinal engagement and connection between the collars 254a and 254b and the spoke 45. As shown in FIG. 13d, engagement surfaces 259a and 259b have an abutting overlie engagement with the bracing element 266 to bear against the bracing element 266 such that the spoke 45 is now firmly anchored to the bracing element 266 to resist spoke tension 30 forces. Gripping collars 254a and 254b may be considered as intermediate connecting elements, as the spoke 45 is connected to the collars 254a and 254b and the collars 254a and 254b are connected to the bracing element 266. It is noted that gripping collars 254a and 254b are two components of a single connecting element assembly and that are laterally displaced toward each other to create longitudinal engagement interfaces 263a and 263b that serve to anchor a single spoke 45. Retaining sleeve 252 serves to laterally retain and lock gripping collars 254a and 254b to maintain engagement interfaces 263a and 263b.

As shown in FIGS. 14a-b, connector 386 includes a shank portion 387 with external dimension 389 and an enlarged head portion 388 with a transition surface 390 therebetween. Transition surface 390 may provide a laterally projecting engagement surface for subsequent engagement with a bracing element (not shown) in a manner similar to transition surface 32 shown in FIG. 3b. Connector 386 also includes a blind cylindrical cavity or hole 392 with an internal configured surface shown here as a series of longitudinally-spaced internal ribs 394 with an inside or minor diameter 395. Internal ribs 394 are shown to provide configured geometry that extends laterally inwardly from the sidewalls of hole 392 and are pre-formed therein prior to any subsequent crimping of the connector 386.

Spoke 400 is similar to spoke 45 of FIGS. 8a-b. Spoke 400 is shown here to be generally round in cross-section and includes longitudinal axis 26 and end portion 399 with an external configured surface shown here as external ribs 384 with an outside or major diameter 393, which is sized to have a clearance fit with the minor diameter 395 of internal ribs 394. Spoke 400 preferably includes reinforcement fibers 398 as described herein. External ribs 384 are shown to provide geometry that projects and extends laterally outwardly relative to the spoke 400 and are pre-formed prior to any subsequent crimping of the connector 386. As shown in FIG. 14a, the end portion 399 is first aligned with hole 392. External ribs 384 and internal ribs 394 are both pre-formed configured surfaces that include laterally projecting geometry. For the purposes of definition herein, the term "preformed" refers to geometry that is formed prior to assembly or pre-assembly of the spoke 400 to the connector 386.

Next, as shown in FIGS. 14b and 14c, the end portion 399 of spoke 400 is inserted into hole 392 in direction 391 and positioned such that the connector 386 overlaps the spoke 400 along the longitudinal axis 26 to create a loose pre-assembly between the spoke 400 and the connector 386, with lateral clearance between the external ribs 384 and internal ribs 394. The blind hole 392 may serve as a depth-stop for the insertion of the spoke 400 and to conveniently control the longitudinal overlap therebetween.

Figures 14D, 14E:
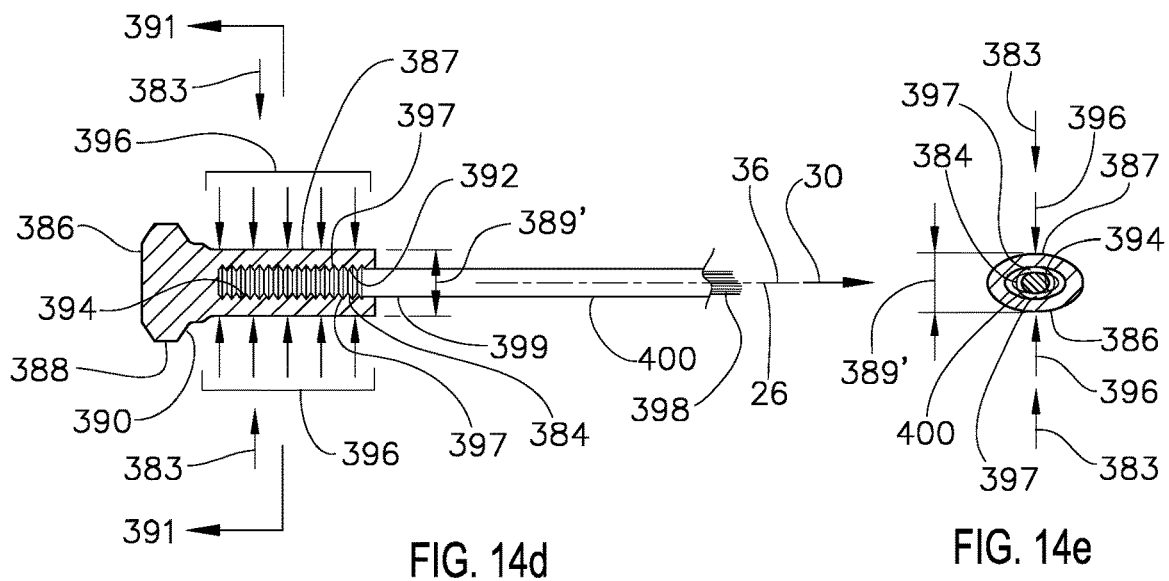
FIG. 14d is a partial cross-sectional view of the embodiment of FIG. 14a, showing a second assembly sequence where the connector is crimped such that internal ribs are engaged to external ribs in a longitudinal engagement.
FIG. 14e is a cross section view of the embodiment of FIG. 14a, taken along 391-391, corresponding to the assembly sequence of FIG. 14d.

Next, as shown in FIGS. 14d and 14e, the connector 386 is crimped onto the spoke 400 with external crimp force 396 applied to the shank portion 387 of the connector 386 to cause this portion of the connector 386 to plastically deform, shrink, and pinch to a reduced external dimension 389'. This deformation of the shank portion 387 causes the hole 392 to shrink in direction 383 such that the internal ribs 394 are shrunk into nested interlocking engagement with external ribs 384. The former lateral clearance between the external ribs 384 and internal ribs 394 is now reduced and preferably eliminated, with a squeezing and gripping lateral preload therebetween such that external ribs 384 are tightly nested and pressed against internal ribs 394. Thus, external ribs 384 now have a laterally extending overlie engagement with the internal ribs 394 at the engagement interface 397 to create a longitudinal engagement therebetween and to securely join the connector 386 to the spoke 400 and to resist spoke tension 30 loads.

As seen in FIG. 14e, the crimp force serves to flatten and distort the cross section of both the spoke 400 and the connector 386 such that laterally opposed portions of the internal ribs 394 have exceptionally high depth of interlocking engagement with the external ribs 384 to improve the structural connection therebetween. Also, the crimped distortion of the shank portion 387 serves to correspondingly distort the cross section of the end portion 399, resulting in a rotationally keyed engagement therebetween about the longitudinal axis 26. The connector 386 may then be connected to the rim 8 as described in FIGS. 3a-b or may alternatively be connected to the hub (not shown, but known in industry). It is noted that connector 386 serves as a singular connecting element that is plastically deformed to laterally displace two portions toward each other to create engagement interface 397 that serves to anchor an individual spoke 400. This plastic deformation serves to laterally retain and lock these two portions in this shrinked orientation to maintain engagement interface 397.

While the configured surfaces of end portion 399 and hole 392 are shown to be external ribs 384 and internal ribs 394 respectively, a wide range of alternate configured surface geometries may be employed to create an interlocking overlie engagement therebetween. In a desirable alternate example, helical external threads may be substituted for external ribs 384 and helical internal threads may be substituted for internal ribs 394. It is preferable that the thread pitch of external threads and internal threads be matched to each other. Prior to crimping, and corresponding to the assembly sequence described in FIGS. 14b-c, there may be lateral clearance between the major diameter of external threads and the minor diameter of internal threads to permit easy insertion and pre-assembly of the spoke with the connector. After crimping, and corresponding to the assembly sequence described in FIGS. 14d-e, this lateral clearance would be reduced, or preferably eliminated, such that these two configured surfaces are pressed together with a lateral preload to insure the maximum interlocking overlie engagement therebetween.

While a clearance fit between internal ribs 394 and external ribs 384 may permit easy pre-assembly between the spoke 400 and the connector 386 as shown in FIG. 14b, the resultant lateral clearance therebetween requires a relatively high degree of crimped shrinkage of the hole 392 in direction 383. In an alternative arrangement, the hole 392 may be originally sized to have an interference fit with the end portion 399 of the spoke 400. The end portion 399 may then be forcibly inserted into hole 392, with the crimp force 396 serving to cinch and tighten the fit between the hole 392 and the end portion 399.

It is noted that FIGS. 11a-e, 12, and 13a-e show a connecting element made of two discreet elements that are displaced toward each other to retain and create an overlie engagement with the mating spoke. In contrast, FIGS. 14a-e and 15a-e utilize a one-piece connecting element that is deformed such that one portion of the connecting element is displaced toward an opposing portion of the connecting element to retain and create an overlie engagement with the mating spoke. This deformation may be plastic deformation such that the connecting element retains the deformed configuration without elastically returning to its original non-deformed configuration.

The embodiment of FIGS. 15a-c has similarity to the embodiment of FIGS. 14a-e in that both the spoke 230 and the connector 286 utilize preformed configured surfaces to create a resultant longitudinal engagement. As shown in FIG. 15a, connector 286 includes a shank portion 287 having external dimension 289 and an enlarged head portion 288 with a transition surface 290 therebetween. Transition surface 290 serves to provide a generally laterally projecting engagement surface for subsequent engagement with a bracing element (not shown) in a manner similar to transition surface 32 of FIG. 3b. Transition surface 290 is shown to be a circular surface that circumscribes the longitudinal axis 26 in an arrangement similar to a conventional spoke nipple. Connector 286 also includes a longitudinal hole 292 therethrough with an internal configured surface shown here as helical internal threads 294 with a minor diameter 295. The flanks of internal threads 294 may be considered as continuous helical engagement surfaces that extend laterally inwardly from the hole 292 and that are pre-formed therein prior to subsequent crimped deformation.

Spoke 230 is generally identical to that described in FIGS. 7a-b and is shown here to be generally round in cross-section. Spoke 230 preferably includes reinforcement fibers 232 as described herein. Major diameter 243 of external threads 238 is sized to be somewhat larger the minor diameter 295 of internal threads 294, as is common in a threadable engagement. The thread flanks of external threads 238 may be considered as continuous helical engagement surfaces that extend laterally outwardly from the spoke 230 and that are pre-formed therein prior to subsequent crimping of the connector 286. As shown in FIG. 15a, the end portion 234 is first aligned with hole 292.

Spoke 230 is also shown to be a fiber-reinforced spoke 230, with high strength fibers 232 in a resin matrix. For highest structural performance, it is preferable that these fibers 232 be generally continuous fibers that extend the full length of the spoke 230. These fibers may be selected from a wide range of reinforcement fiber types well known in industry, including carbon fibers, among others. The matrix may be a metallic material or it may be a polymer resin material such as a thermoplastic or a thermoset resin. It may also be advantageous that the external surface of the spoke 230 include a coating, such as a resin-rich polymer coating to provide protection for the fibers and/or to provide an easily-formable surface to create external threads 238.

Next, as shown in FIGS. 15b and 15c, the end portion 234 of spoke 230 is threadably preassembled with hole 292 in direction 301 and resulting direction 291 such that external threads 238 are loosely threadably engaged with internal threads 294 and the end portion 234 longitudinally overlaps the hole 292. Flanks of external threads 284 are laterally overlapping the flanks of internal threads 294 in a threadable overlie engagement to create a loose pre-assembly between the spoke 230 and the connector 286. As is common in threadable assemblies, there is preferably a slight lateral clearance between external threads 238 and internal threads 294 to allow for this threadable assembly.

Next, as shown in FIGS. 15d and 15e, the connector 286 is crimped onto the spoke 230 with external crimp force 296 applied to the shank portion 287 of the connector 286 to cause this portion of the connector 286 to plastically deform, shrink, flatten, and pinch down to a reduced external dimension 289'. This deformation of the shank portion 287 causes the hole 292 to correspondingly shrink in direction 298 and laterally pinch the end portion 234 such that the internal threads 294 are pressed into tightly nested and interlocking longitudinal engagement with external threads 238 at engagement interface 297. The former lateral clearance between the external threads 238 and internal threads 294 is now reduced and preferably eliminated, with a squeezing and gripping laterally preloaded interface therebetween such that external threads 238 are tightly nested and laterally pressed against internal threads 294.

The thread forms of internal threads 294 and external threads 238 are shown here as matched V-shaped thread forms such that, upon crimping, the mating thread flanks may tightly wedge against each other to create a high level of friction therebetween so that this threadable engagement is now a binding engagement to rotationally bind and lock the spoke 230 to the connector 286 about the longitudinal axis 26, also restricting relative rotation between the connector 286 and the spoke 230. Further, this crimped engagement causes external threads 238 to more deeply engage the internal threads 294, taking up any internal clearance therebetween such that internal threads 294 fully support the external threads 238 (and vice versa) so that the thread flanks have less tendency to flex and squirm under applied spoke tensile force 30, and such that this threadable engagement may support even greater tensile load. This lateral preloaded engagement is particularly effective when the spoke 230 is made of a softer and/or more flexible material, such as fiber reinforced polymer, and the connector 286 is made of a harder and/or stiffer material, such as aluminum or other metallic material. In such a case, the harder aluminum internal threads 294 effectively support the softer external threads 238 such that these external threads 238 maintain their optimal thread form under the application of spoke tension 30 force. Further, this binding engagement results in a deeper lateral overlie engagement between mating thread flanks, to further augment this longitudinal engagement and to support yet greater spoke tension 30 force. The result is a highly effective longitudinal threadable engagement between the spoke 230 and the connector 286 to support spoke tension 30 forces that is especially effective with spokes made of fiber reinforced composites. The connector 286 may then be connected to the rim 8 as described in FIGS. 3a-b or may alternatively be connected to the hub.

While the connector 286 may be made of a wide range of ductile materials, it may be preferable that the connector 286 be made of a lightweight metallic material such as aluminum or magnesium alloys, to minimize weight. The spoke 230 may be made of a wide range of materials known in industry. However, it is noted that fiber-reinforced composite material has particularly excellent properties to fit the requirements of spoke construction, including light weight and high strength. Heretofore, such fiber-reinforced spokes have proven to be difficult to terminate. However, the present invention is well suited to create terminations and/or couplings for use with fiber-reinforced spokes.

Figure 16:
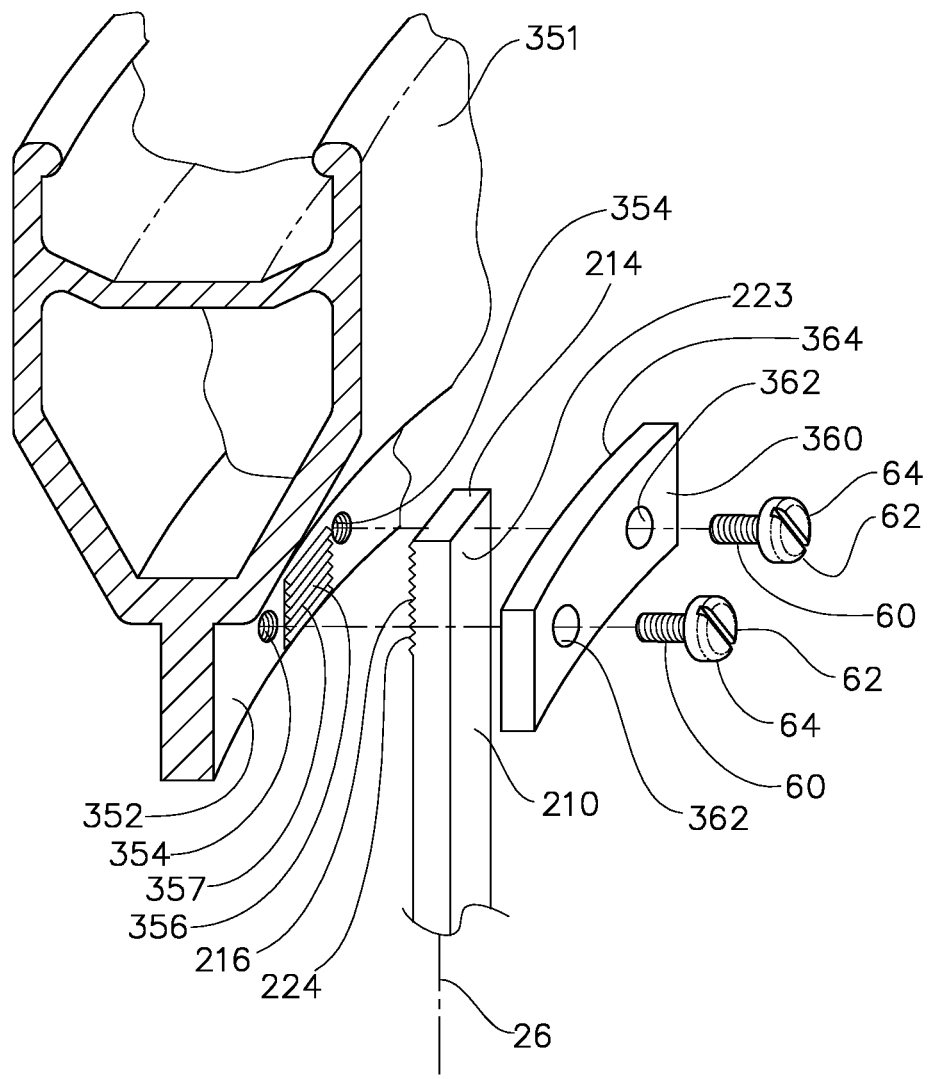
FIG. 16 is a partial cross sectional exploded view of an sixteenth embodiment of the present invention, showing a laterally sandwiched engagement between the spoke and the rim, where both the rim and spoke include pre-formed engagement surfaces, including a clamping member to clamp the spoke against the rim and maintain a longitudinal engagement therebetween to support spoke tension forces.

While the embodiments of FIGS. 11a-c and FIG. 12 show how a connecting element may be integral with the hub flange, the embodiment of FIG. 16 illustrates that a connecting member may alternatively be integral with the outer rim hoop 351 as well. Rim hoop 351 is shown in radial cross section and is of generally conventional "double-wall" configuration, however it also includes a radially inwardly extending tab portion 352. Tab portion 352 includes internally threaded holes 354 and a knurled or configured surface 356 pre-formed therein that includes a series of pre-formed longitudinally spaced ribs 357 that extend perpendicular to the longitudinal axis 26. Clamping member 360 includes clamping surface 364 and clearance holes 362 that are aligned with threaded holes 354. Spoke 210 is identical to that described in FIGS. 6a-b and is of slightly flattened cross section as shown, with its end portion 214 positioned between knurled face 356 and clamping member 360 and with the configured surface 216 facing knurled face 356 as shown. Screw 62 includes threaded portion 60 and head 64.

Upon assembly, the threaded portions 60 of the two screws 62 are first passed through their respective clearance holes 362 and then threadably assembled within their respective threaded holes 354. Threadably tightening screws 62 serves to laterally clamp and sandwich the end portion 214 between the tab portion 352 and the clamping member 360, with the ridges 224 of configured surface 216 nested and engaged with the ribs 357 of configured surface 356 and with clamping surface 364 bearing against surface 223. The spoke 210 is thus sandwiched between configured surface 356 and clamping surface 364. By threadably tightening the screws 62, the clamping member 360 is pressed toward the tab portion 352 to provide a lateral preload to squeeze and grip the spoke 210 between clamping surface 356 and knurled face 356 to create a laterally overlapping longitudinal overlie engagement between the ribs 357 and the ridges 224 that are nested and interlocked therebetween. This longitudinal engagement serves to firmly connect the spoke 210 to the rim hoop 351 to support spoke tension 30 loads.

Figure 17A:
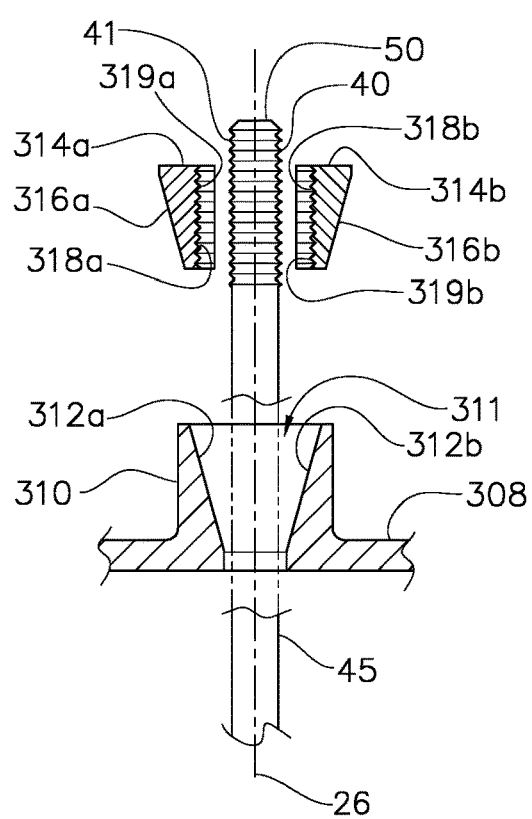
FIGS. 17a-c is are partial cross-section views of a seventeenth embodiment of the present invention, and showing a sequence of operations involved in connecting the spoke to the bracing element.
Figure 17B:
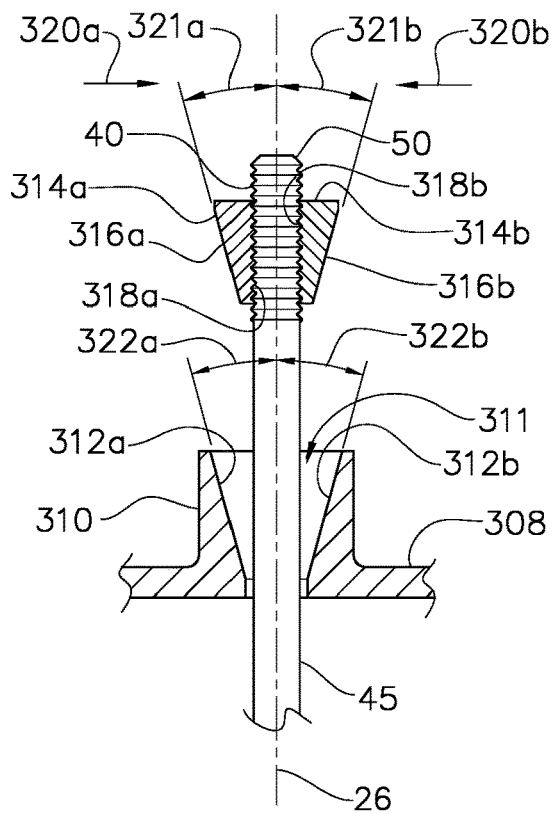
Figure 17C:
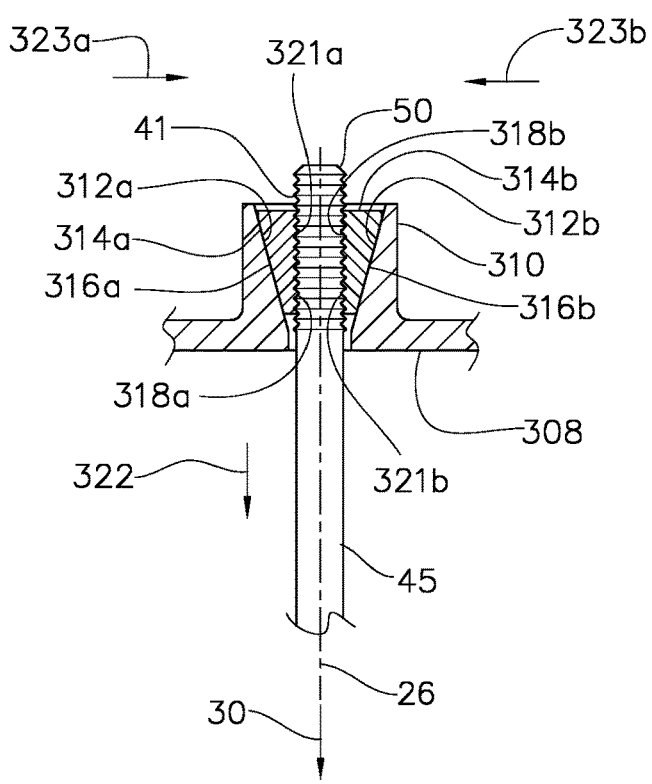

The embodiment of FIGS. 17a-c is similar in many respects to the embodiment of FIGS. 13a-d in that two laterally opposed connecting elements are utilized to laterally sandwich the spoke to provide two corresponding longitudinal engagements with the spoke. While the embodiment of FIGS. 13a-d uses a sleeve 252 as a hoop to laterally bind the collars 254a and 254b together to maintain the longitudinal engagement with the spoke 45, the embodiment of FIGS. 17a-c utilize a spoke bed 308 with an integral collar 310 that has tapered internal sidewalls 312a and 312b to laterally wedge the corresponding wedges 314a and 314b laterally toward each other to maintain their longitudinal engagement with the spoke 45.

FIG. 17a shows the components in exploded view prior to assembly. Spoke 45 is identical to the spoke 45 described in FIGS. 8a-b. Spoke bed 308 represents the portion of a bracing element to which the spoke 45 is connected and includes an integral collar 310 with an opening 311 therethrough having ramped or tapered internal sidewalls 312a and 312b laterally opposed to each other as shown. Wedges 314a and 314b serve as connecting elements and include ramped sides 316a and 316b respectively and respective configured reliefs 318a and 318b laterally opposed thereto. Configured reliefs 318a and 318b are each configured to include a series of longitudinally spaced internal ribs 319a and 319b that are pre-formed therein similar to configured surfaces 260a and 260b described in FIGS. 13a-d. The configured reliefs 318a and 318b are matched to the ribs 41 of the knurled surface 40 of the spoke 45.

FIG. 17b shows the wedges 314a and 314b as first pre-assembled to the end portion 50 of spoke 45 in respective directions 320a and 320b such that the ribs 319a and 319b are each nested to laterally overlap with the ribs 41 of knurled surface 40. Ribs 319a and 319b and 41 may be considered to provide engagement surfaces that result in an interlocking overlie engagement between the wedges 314a and 314b and the spoke 45. Ramped sides 316a and 316b have respective wedging angles 321a and 321b that are preferably matched to the wedge angles 322a and 322b of internal sidewalls 312a and 312b respectively.

Next, as shown in FIG. 17c, this preassembly is assembled to the collar 310 in direction 322 until ramped sides 316a and 316b contact respective internal sidewalls 312a and 312b. Further displacement in direction 322 forces ramped sides 316a and 316b to wedge against internal sidewalls 312a and 312b, thereby serving to further laterally press wedges 314a and 314b toward each other and also to laterally press the configured reliefs 318a and 318b against knurled surface 40, resulting in an overlying longitudinal engagement between ribs 41 and the ribs 319a and 319b at corresponding engagement interfaces 321a and 321b to support spoke tension 30 forces. This longitudinal engagement is considered as a self-energizing longitudinal engagement in that, as the spoke tension 30 load is increased, the wedging action between the internal sidewalls 312a and 312b and ramped sides 316a and 316b further presses the wedges 314a and 314b in respective directions 323a and 323b to also further laterally preload and fortify their respective longitudinal engagements with the spoke 45.

Figure 18A:
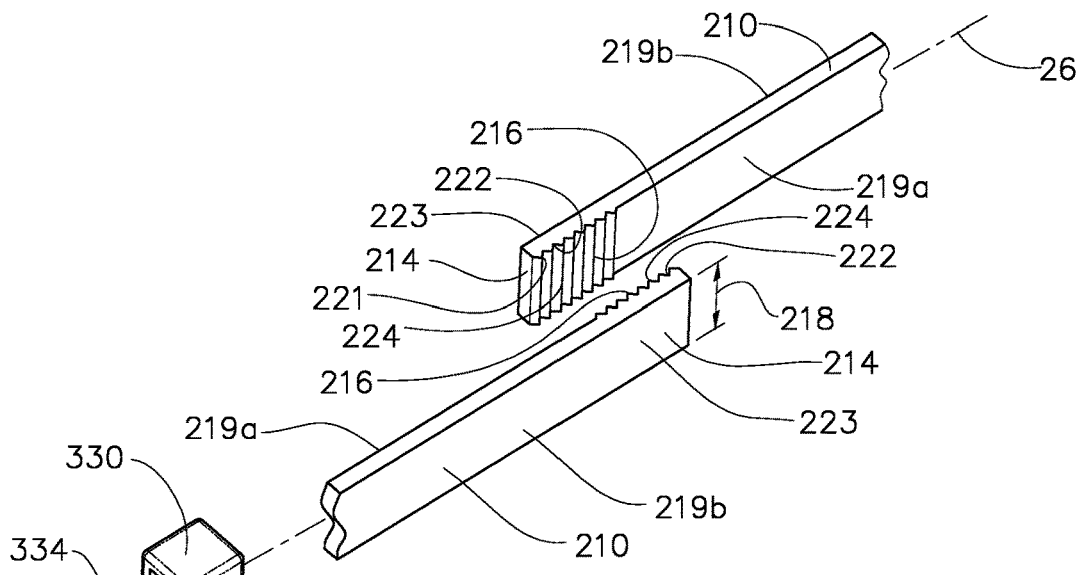
FIGS. 18a-c is are partial perspective views of an eighteenth embodiment of the present invention, and showing a sequence of operations involved in connecting two spokes to each other in a coupling arrangement.
Figure 18B:
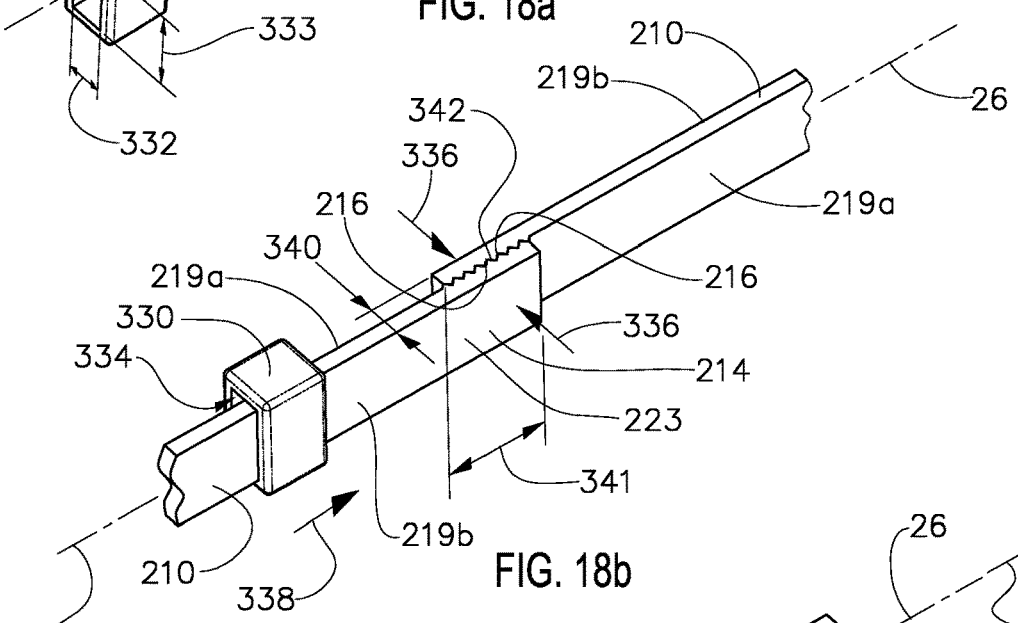
Figure 18C:
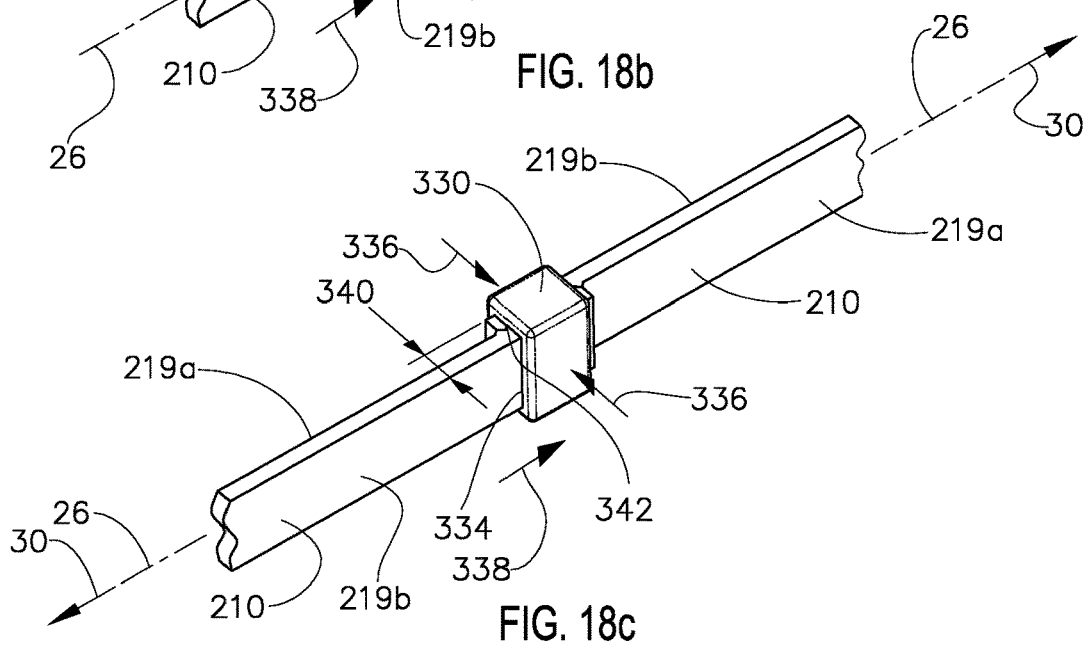

FIGS. 18a-c describe an arrangement where two spokes may be engaged to each other in a longitudinal engagement and also provide an example of a coupling arrangement. Spokes 210 are identical to that described in FIGS. 6a-b. Also included is sleeve 330 with a longitudinally extending opening 334 therethrough, having a width 332 and a height 333, which corresponds to the width 218 of spokes 210, as shown in FIG. 18a.

FIG. 18b shows the two spokes 210 assembled to each other in direction 336 so that their configured surfaces 216 are longitudinally overlapping in overlap region 341 and laterally assembled each other such that peaks 221 of one spoke 210 are nested in valleys 222 of the opposing spoke 210 and vice versa. This nested arrangement results in a longitudinal engagement interface 342 between the two matched, mating and interlocked configured surfaces 216. As shown in FIG. 18c, sleeve 330 is then assembled in direction 338 to circumferentially surround the overlap region 341 with width 332 corresponding to the lateral distance between the two surfaces 223 such that these surfaces 223 are laterally abutting opening 334. Thus, opening 334 serves to constrain the laterally outward displacement of the two end portions 214 and thereby to maintain the engagement interface 342 therebetween. Spokes 210 are now structurally engaged and locked to each other at the longitudinal engagement interface 342 to support spoke tension 30 loads.

In an arrangement with width 332 generally equal to the lateral distance 340 between surfaces 223 as shown in FIG. 18b, the sleeve 330 may be easily slid over overlap region 341 to create a retained engagement at engagement interface 342. Alternatively, width 332 may be slightly smaller than this lateral distance 340 between surfaces such that the sleeve 330 must be forcibly assembled over overlap region 341 in a press fit. This press fit serves to provide a laterally inward preload at the engagement interface 342, providing greater nesting and friction therebetween to further fortify the engagement interface 342 as described hereinabove.

While my above description contains many specificities, these should not be construed as limitations on the scope of the invention, but rather as exemplifications of embodiments thereof. It is to be understood that the invention is not limited to the illustrations described and shown herein, which are deemed to be merely illustrative of the best modes of carrying out the invention, and which are susceptible to modification of form, size, and arrangement of parts and details of operation. For example:

While the connecting element of the present invention may be directly connected to the bracing element (such as the rim or the hub), there are many cases where it is desirable to include one or more intermediate connecting elements to facilitate this connection. For example, the connecting element may engage an intermediate connecting element and the intermediate connecting element may engage the bracing element.

While the embodiments described herein do not mention the use of adhesive or bonding agent, it is envisioned that the use of adhesive within the engagement interface may be utilized to augment the strength of the crimped joinder. In an exemplary arrangement, an epoxy paste adhesive may be applied to the engagement interface. After the adhesive is cured, the adhesion created by the adhesive may serve to further augment the joinder between the spoke and the connector.

The embodiments shown here show the spokes being held in tension, in the construction of tension-spoke wheels where spoke tension 30 load is directed longitudinally inwardly. This is for common illustration purposes only. It is understood that the spokes of these embodiments may alternatively be configured to be held in compression, corresponding to construction of compression-spoke wheels where spoke tension 30 load is directed longitudinally outwardly.

The embodiments of FIGS. 14a-e and 15a-e describe a singular connecting element (i.e. connectors 386 and 286) that is deformed such that two laterally opposed portions of the single connecting element are laterally displaced to provide an overlie engagement with the spoke (400 and 230) to resist spoke tension forces 30 therebetween. The embodiments of FIGS. 11a-e, 12, 13a-e, 16, and 17a-c describe a connecting element as an assembly that includes two discreet elements that are laterally displaced to provide an overlie engagement with the spoke to resist spoke tension forces 30 therebetween. It is further envisioned that a connecting element assembly may alternatively include three or more discreet elements that are laterally displaced to provide an overlie engagement with the spoke to resist spoke tension forces 30 therebetween. It is further envisioned that a singular connecting element may be deformed such that three or more portions of a single connecting element are laterally displaced to provide an overlie engagement with the spoke (400 and 230) to resist spoke tension forces 30 therebetween.

While the above description is particularly focused on bicycle or vehicle wheel spokes as tensile elements, and this is the preferred embodiment of the present invention, however it is envisioned that the present invention may be adapted to applications involving a wide range of tensile element applications outside of vehicle wheel spoke applications. Some alternative exemplary tensile element applications may include control cables, guy wires, fiber optic cables, overhead high-tension lines, architectural and infrastructure cabling, pre-stressed rebar, etc.

Thus, the present invention provides a vehicle wheel that is inexpensive to produce, lends itself easily to high-volume manufacturing methods, is light in weight and is strong and reliable. Further, the present invention allows the connector to include geometry to optimize its engagement with the bracing element and/or an intermediate element. Further still, the present invention reduces wheel weight by facilitating the utilization of light weight materials, by allowing greater freedom in geometry to optimize the design, by facilitating the use of fiber reinforced spokes. Yet further, the present invention increases the strength and reliability of the wheel by reducing stresses in components and connections and by eliminating any clearances or relative movement between the hub and spokes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A longitudinal tensile element connection, comprising:
 a first bracing element;
 a second bracing element;
 a tensile element extending between said first bracing element and said second bracing element, with a first portion connected to said first bracing element, a second portion opposed to said first portion and connected to said second bracing element, a span portion between said first bracing element and said second bracing element, and a tensile axis of applied tensile load along said span portion;
 wherein said tensile element includes a longitudinal rod that is comprised of reinforcement fibers in a matrix;
 wherein said longitudinal rod has an external rod surface, a longitudinal axis, a longitudinal length greater than a lateral width, and a generally constant cross section profile along said longitudinal axis;
 wherein said tensile element is comprised of said longitudinal rod with a configured surface formed therein; said configured surface including a laterally outwardly projecting engagement surface;
 wherein said tensile element is connected to said first bracing element by an overlie engagement at said engagement surface to restrain said tension load;
 wherein said configured surface comprises a longitudinal configured surface comprised of a multiplicity of said engagement surfaces that are longitudinally spaced over a longitudinal length;
 wherein the longitudinal length of said longitudinal configured surface is at least twice the cross sectional thickness of said longitudinal rod; and
 wherein said configured surface includes one of (i) a first engagement surface and a second engagement surface laterally opposed to said first engagement surface; or (ii) a generally smooth external surface region laterally opposed to said engagement surface.

2. The longitudinal tensile element connection according to claim 1, wherein said longitudinal rod is a non-round longitudinal rod with a cross-sectional width greater than a cross-sectional thickness thereof.

3. The longitudinal tensile element connection according to claim 1, wherein at least a portion of said reinforcement fibers are continuous fibers that extend generally longitudinally along said longitudinal length.

4. The longitudinal tensile element connection according to claim 1, wherein at least a portion of said matrix is a polymeric resin matrix at said configured surface.

5. The longitudinal tensile element connection according to claim 1, wherein said engagement surface is located adjacent one of said first end or said second end of said tensile element.

6. A longitudinal tensile element connection, comprising:
 a first bracing element;
 a second bracing element;
 a tensile element extending between said first bracing element and said second bracing element, with a first portion connected to said first bracing element, a second portion opposed to said first portion and connected to said second bracing element, a span portion between said first bracing element and said second bracing element, and a tensile axis of applied tensile load along said span portion;
 wherein said tensile element includes a preformed longitudinal rod that is comprised of reinforcement fibers in a matrix;
 wherein said longitudinal rod has an external rod surface, a longitudinal axis, a longitudinal length greater than a lateral width, and a generally constant cross section profile along said longitudinal axis;
 wherein said tensile element is comprised of said longitudinal rod with a configured surface formed therein;
 wherein said tensile element is connected to said first bracing element by an overlie engagement at said configured surface to restrain said tension load;
 wherein said configured surface comprises a longitudinal configured surface comprised of a multiplicity of said engagement surfaces that are longitudinally spaced over a longitudinal length;
 wherein the longitudinal length of said longitudinal configured surface is at least twice the cross sectional thickness of said longitudinal rod; and
 wherein at least one of said engagement surfaces are longitudinally spaced at least 100 millimeters from both said first portion and said second portion.

7. The longitudinal tensile element connection according to claim 1, wherein said configured surface includes a first engagement surface and a second engagement surface laterally opposed to said first engagement surface.

8. The longitudinal tensile element connection according to claim 1, wherein said tensile element includes a generally smooth external surface region laterally opposed to said engagement surface.

9. The longitudinal tensile element connection according to claim 1, wherein said engagement surface corresponds to a region of variable cross section geometry, wherein a lateral cross sectional dimension of said tensile element is variable along said longitudinal axis within said configured surface.

10. The longitudinal tensile element connection according to claim 1, wherein said engagement surface circumscribes said tensile element about said longitudinal axis.

11. The longitudinal tensile element connection according to claim 1, wherein said engagement surface is a helical engagement surface to include a laterally outwardly projecting helical thread rib.

12. The longitudinal tensile element connection according to claim 1, wherein said engagement surface extends along said external surface in a direction to cross said longitudinal axis.

13. The longitudinal tensile element connection according to claim 1, including a connecting element, wherein said connecting element is assembled to said tensile element such that said engagement surface laterally overlies a mating surface of said connecting element in an overlie engagement at an engagement interface therebetween to connect said tensile element to said bracing element and to resist said tensile load at said engagement interface.

14. The longitudinal tensile element connection according to claim 1, wherein said tensile element is a vehicle wheel spoke.

15. A method for producing a longitudinal tensile element, wherein said tensile element comprises:
a first end portion, a second end portion longitudinally opposed to said first portion, and a span portion longitudinally between said first end portion and said second end portion;
a tensile axis of applied tensile load along said span portion;
an external tensile element surface;
said method comprising the steps of forming an engagement surface in said tensile element, comprising:
(a) initially producing a longitudinal rod as a pre-formed longitudinal element having a longitudinal axis with a longitudinal length greater than a lateral width, and a generally constant cross section profile along said longitudinal axis, wherein said tensile element is comprised of reinforcement fibers in a matrix, and wherein said matrix has an original state corresponding to the service temperature of said tensile element with a corresponding hardness;
(b) heating a localized region of said tensile rod to temporarily achieve a softened state of reduced hardness and increased plasticity in comparison with said original state;
(c) deforming said localized region, while said localized region is in said softened state, by applying pressure to said localized region to deform said external surface to plastically form a configured surface therein that includes a laterally outwardly projecting engagement surface;
(d) cooling said localized region to return said localized region to said original state such that said engagement surface is maintained in said external surface, wherein said tensile element comprises said longitudinal rod with said engagement surface formed therein; and
(e) connecting said tensile element to a bracing element by an overlie engagement with said engagement surface such that said connection restrains said tensile load.

16. The method according to claim 15, wherein said localized portion is plastically formed by means of a forming die.

17. The method according to claim 15, wherein said softened state is achieved simultaneously with said application of said pressure.

18. The method according to claim 17, wherein said localized portion is plastically formed by means of a forming die and wherein a forming surface of said forming die serves to provide said pressure, and wherein said localized region is heated due to mechanical energy transmitted to said localized region from said forming surface.

19. The method according to claim 18, wherein said forming surface is in an ultrasonic horn, wherein ultrasonic vibration of said ultrasonic horn serves to provide said mechanical energy.

20. The method according to claim 15, wherein said pressure is applied to said localized region in a generally longitudinal direction.

21. The method according to claim 15, wherein said pressure is applied to said localized region in a generally lateral direction.

22. The method according to claim 15, wherein said longitudinal rod is at least one of a rigid or a semi-rigid element in that said longitudinal rod is generally self supporting such that said longitudinal rod will not slump under the weight thereof.

23. The method according to claim 15, wherein the overall longitudinal length of said longitudinal rod is generally maintained during said deforming of said localized region.

24. The method according to claim 15, wherein said deforming of said localized region serves to shorten the overall longitudinal length of said longitudinal rod.

25. The method according to claim 15 wherein said configured surface comprises a longitudinal configured surface comprised of a multiplicity of said engagement surfaces that are longitudinally spaced over a longitudinal length.

26. The method according to claim 15, wherein at least a portion of said matrix is a polymeric resin matrix at said localized region.

27. The method according to claim 15, wherein said engagement surface extends along said external surface in a direction to cross said longitudinal axis.

28. The method according to claim 26, wherein said polymeric resin matrix is a thermoplastic polymeric resin.

29. The method according to claim 15, wherein said configured surface comprises a bent tensile element surface, wherein said longitudinal rod is deformably bent to have a generally constant lateral cross sectional dimension at said engagement surface.

30. The method according to claim 15, wherein said tensile element includes a first engagement surface and a second engagement surface laterally opposed to said first engagement surface.

31. The method according to claim 15, wherein said tensile element is a vehicle wheel spoke.

32. The method according to claim 15, wherein at least a portion of said reinforcement fibers are continuous fibers that extend generally longitudinally along said longitudinal length.

33. The method according to claim 15, wherein said engagement surface is a helical engagement surface to include a laterally outwardly projecting helical thread rib.

* * * * *